United States Patent
Oh et al.

(10) Patent No.: US 9,780,844 B2
(45) Date of Patent: Oct. 3, 2017

(54) COMMUNICATION TERMINAL FOR PERFORMING DISTRIBUTED COMMUNICATION IN COMMUNICATION SYSTEM AND COMMUNICATION METHOD FOR SAME

(71) Applicant: AJOU UNIVERSITY INDUSTRY-ACADEMIC COOPERATION FOUNDATION, Suwon (KR)

(72) Inventors: Seong Keun Oh, Yongin (KR); Min Lee, Suwon (KR)

(73) Assignee: AJOU UNIVERSITY INDUSTRY-ACADEMIC COOPERATION FOUNDATION, Suwon (KR)

(*) Notice: Subject to any disclaimer, the term of this patent is extended or adjusted under 35 U.S.C. 154(b) by 210 days.

(21) Appl. No.: 14/370,047

(22) PCT Filed: Dec. 27, 2012

(86) PCT No.: PCT/KR2012/011518
§ 371 (c)(1),
(2) Date: Jun. 30, 2014

(87) PCT Pub. No.: WO2013/100602
PCT Pub. Date: Jul. 4, 2013

(65) Prior Publication Data
US 2014/0313897 A1    Oct. 23, 2014

(30) Foreign Application Priority Data
Dec. 30, 2011  (KR) .......................... 10-2011-0147918

(51) Int. Cl.
*H04B 7/24*    (2006.01)
*H04B 7/026*    (2017.01)
(Continued)

(52) U.S. Cl.
CPC .............. *H04B 7/026* (2013.01); *H04B 7/024* (2013.01); *H04B 7/0617* (2013.01); *H04B 7/0689* (2013.01); *H04B 7/0871* (2013.01)

(58) Field of Classification Search
None
See application file for complete search history.

(56) References Cited

U.S. PATENT DOCUMENTS 9,031,590 B2 *  5/2015  Park ...................... H04B 7/026
                                                    455/41.2
2003/0026222 A1 *  2/2003  Kotzin .................. H04B 7/026
                                                    370/335
(Continued)

FOREIGN PATENT DOCUMENTS

KR    10-2008-0006365 A    1/2008
KR    10-2008-0023505 A    3/2008
(Continued)

OTHER PUBLICATIONS

3GPP TS 45.001 V10.0.0. 3rd Generation Partnership Project; Technical Specification Group GSM/EDGE Radio Access Network; Published: Mar. 2011.*
(Continued)

*Primary Examiner* — Jeffrey M Rutkowski
*Assistant Examiner* — Andre Tacdiran

(57) ABSTRACT

The present invention relates to a system for providing distributed communication between communication terminals and a method for same. The method for providing distributed communication between communication terminals in a communication system includes the steps of: a first communication terminal receiving at least one first signal from at least one target communication device; the first communication terminal collecting at least one second signal that at least one second communication terminal receives from the at least one target communication device and at
(Continued)

least one third signal that the at least one second communication terminal obtains by processing the at least one second signal in a preset processing scheme; and the first communication terminal combining the at least one first signal and the at least one second signal, or the at least one first signal and the at least one third signal.

9 Claims, 23 Drawing Sheets

(51) Int. Cl.
*H04B 7/024* (2017.01)
*H04B 7/06* (2006.01)
*H04B 7/08* (2006.01)

(56) References Cited

U.S. PATENT DOCUMENTS

| | | | |
|---|---|---|---|
| 2009/0239494 A1* | 9/2009 | Park | H04L 1/08 |
| | | | 455/278.1 |
| 2010/0220849 A1* | 9/2010 | Colbert | H04M 3/20 |
| | | | 379/208.01 |
| 2011/0105051 A1* | 5/2011 | Thomas | H04B 7/0617 |
| | | | 455/69 |
| 2011/0171992 A1* | 7/2011 | Seo | H04W 52/10 |
| | | | 455/522 |
| 2011/0287790 A1* | 11/2011 | Haustein | H04B 7/0417 |
| | | | 455/500 |
| 2012/0014272 A1* | 1/2012 | Zhou | H04L 5/0035 |
| | | | 370/252 |
| 2012/0021738 A1* | 1/2012 | Koo | H04B 7/024 |
| | | | 455/422.1 |
| 2012/0184232 A1* | 7/2012 | Lim | H04B 7/024 |
| | | | 455/129 |
| 2013/0002487 A1* | 1/2013 | Hosoya | H04B 7/0617 |
| | | | 342/372 |
| 2013/0029680 A1* | 1/2013 | Park | H04W 72/0406 |
| | | | 455/450 |

FOREIGN PATENT DOCUMENTS

| | | |
|---|---|---|
| KR | 10-2010-0120820 A | 11/2010 |
| KR | 10-2011-0041273 A | 4/2011 |
| KR | 10-2011-0120774 A | 11/2011 |

OTHER PUBLICATIONS

NAM. Cooperative Communication Technologies for LTE-Advanced. 978-1-4244-4296-6/10. ICASSP. IEEE. 2010.*
International Search Report for PCT/KR2012/011518 filed on Dec. 27, 2012.

* cited by examiner

[FIG. 1]
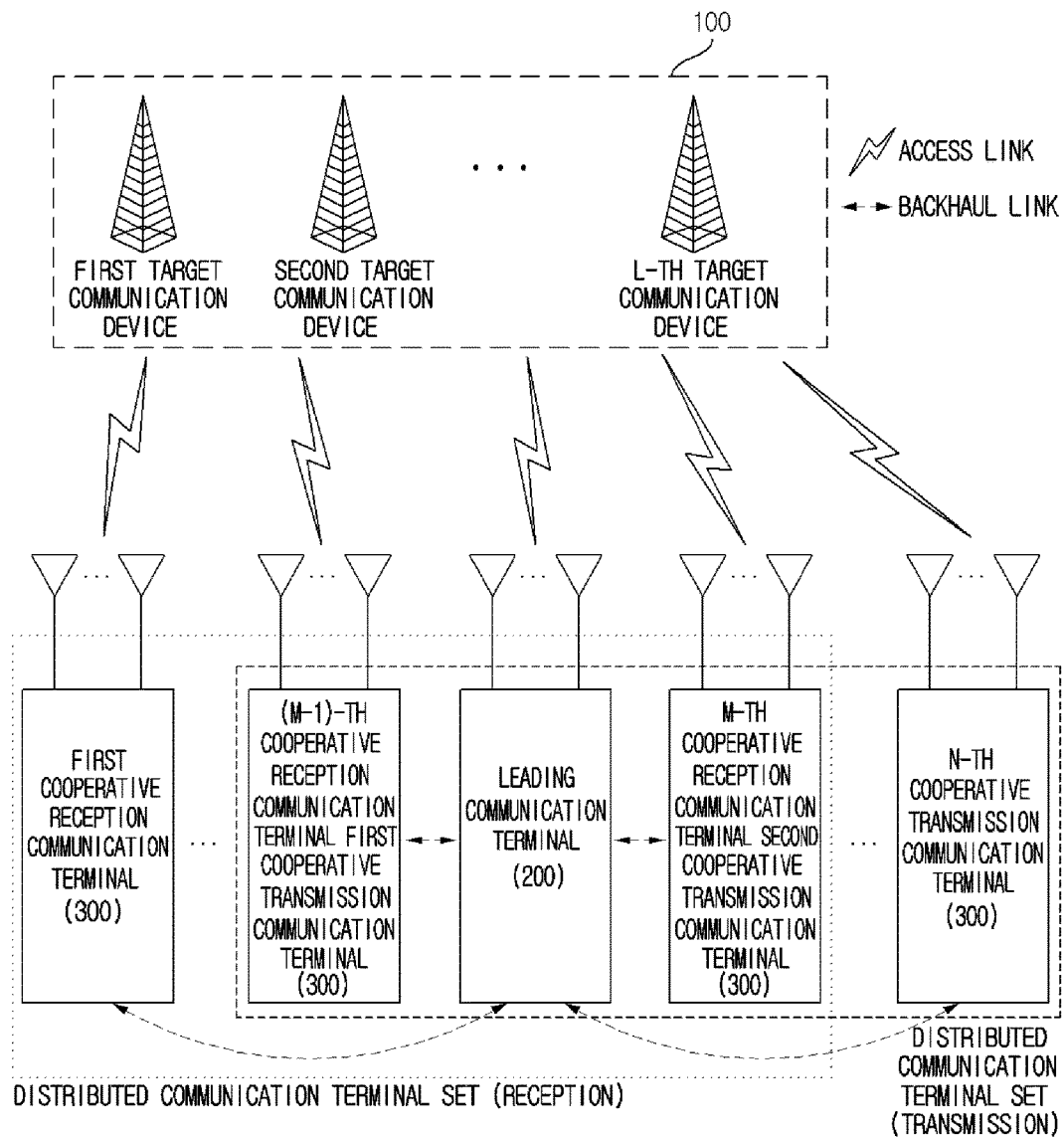

[FIG. 2]
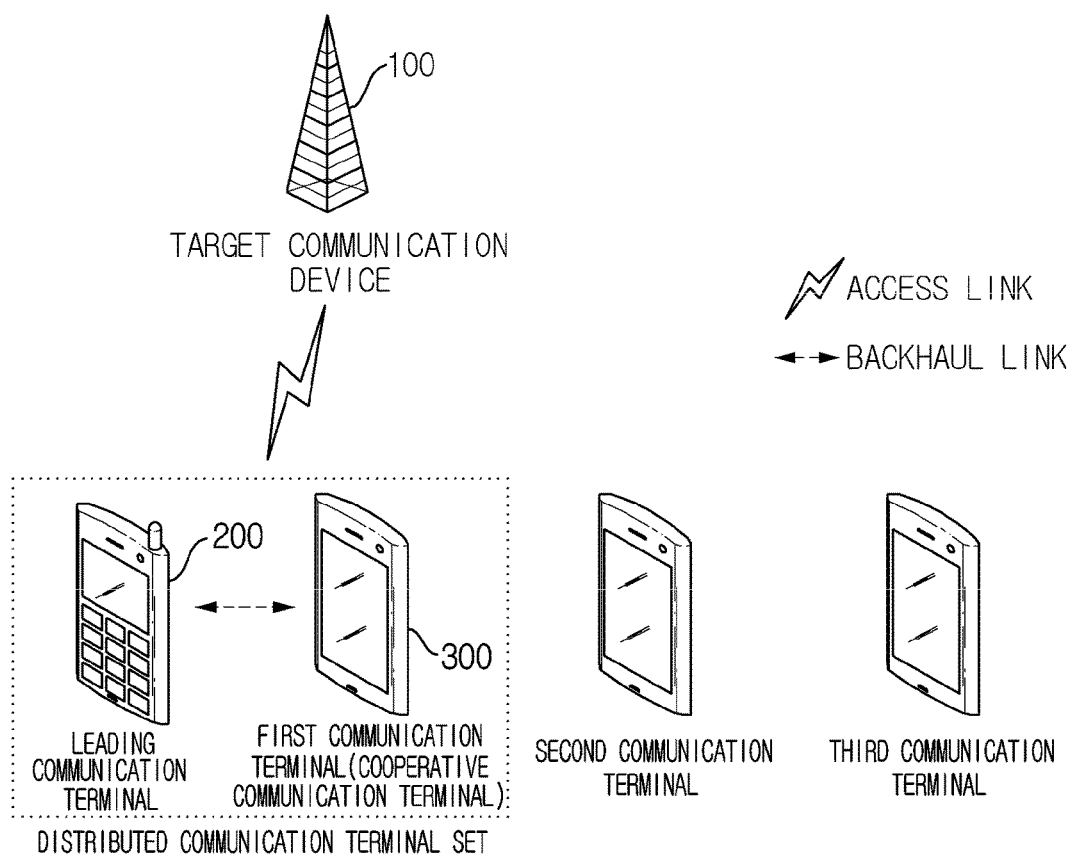

[FIG. 3]
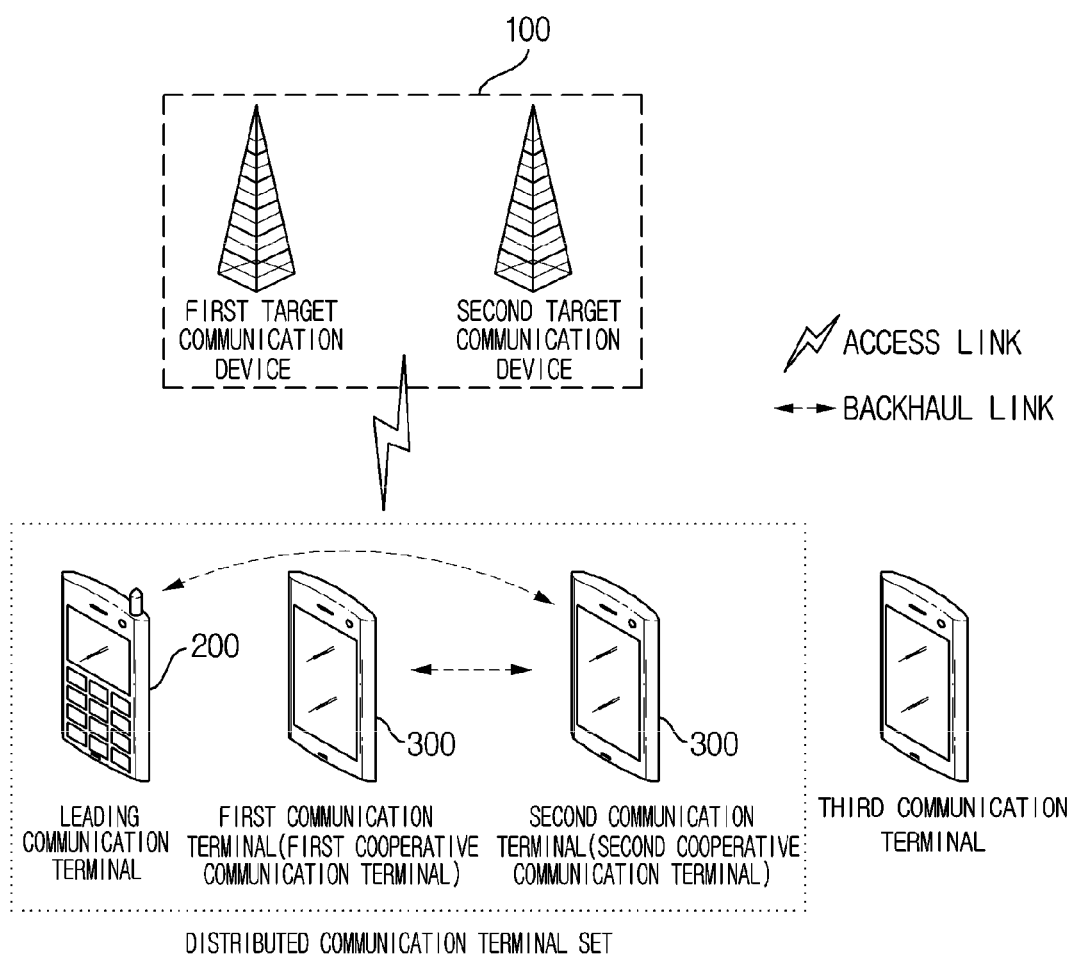

[FIG. 4]
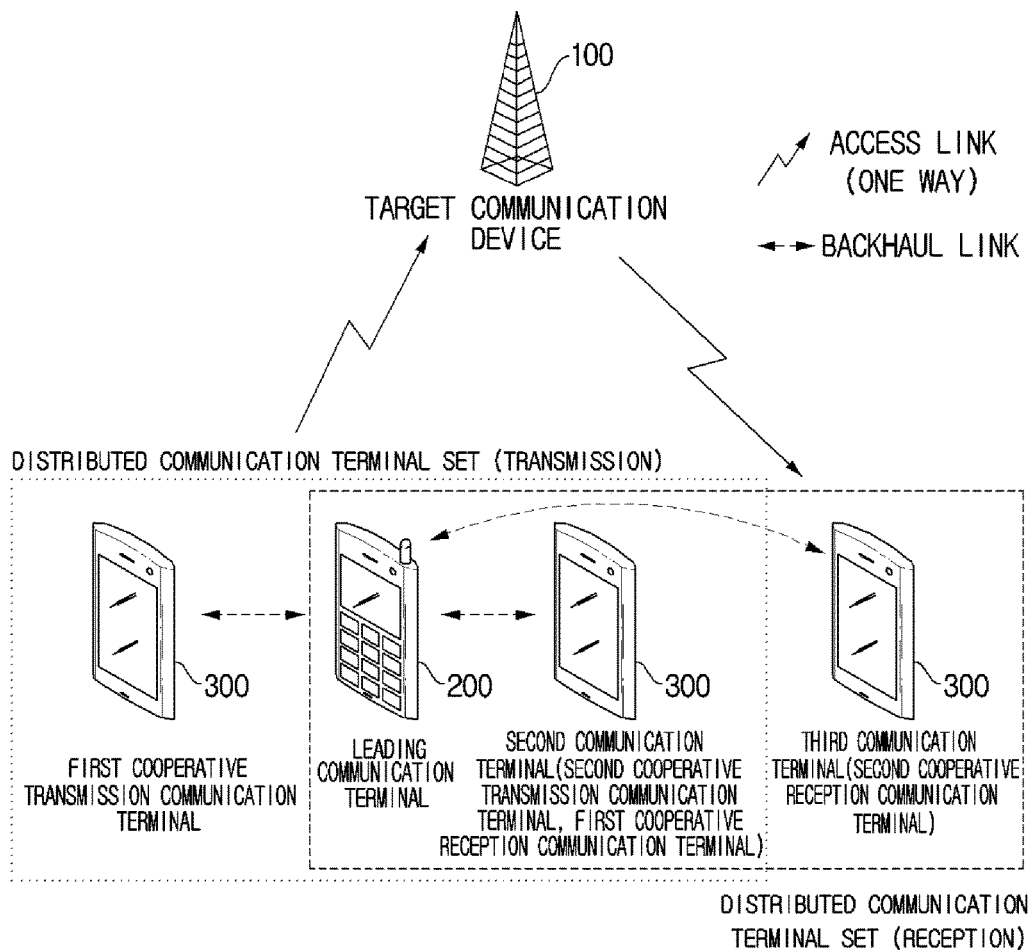

[FIG. 5]
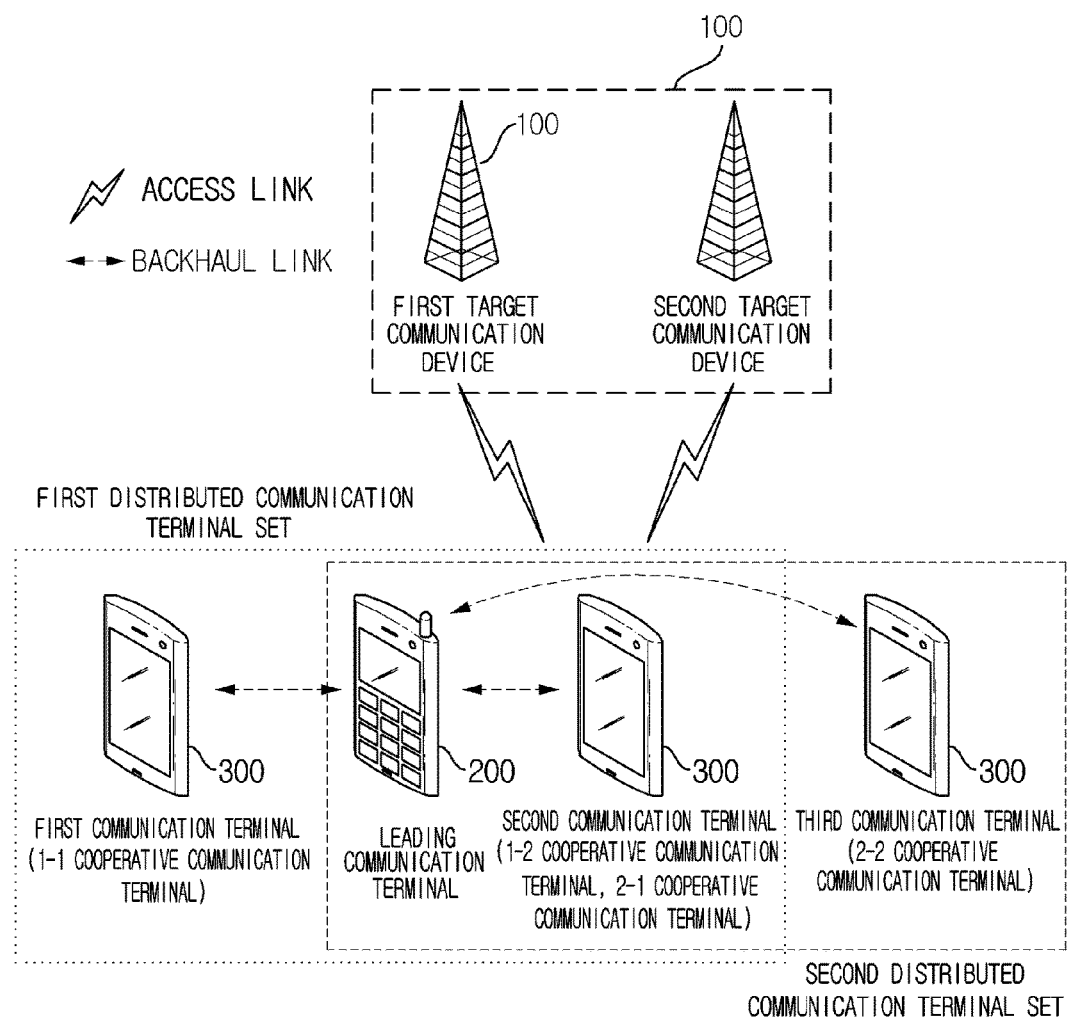

[FIG. 6]
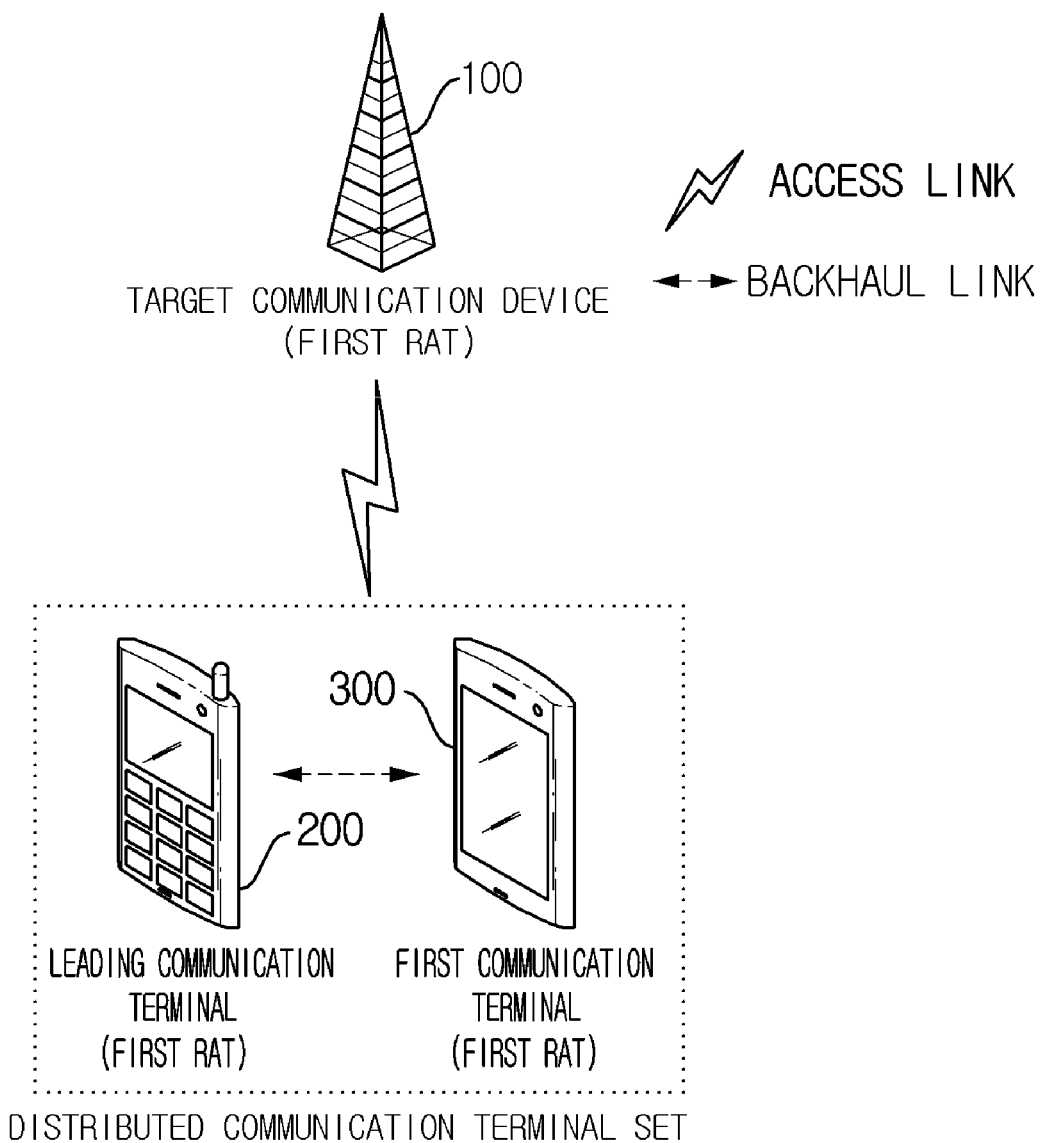

[FIG. 7]
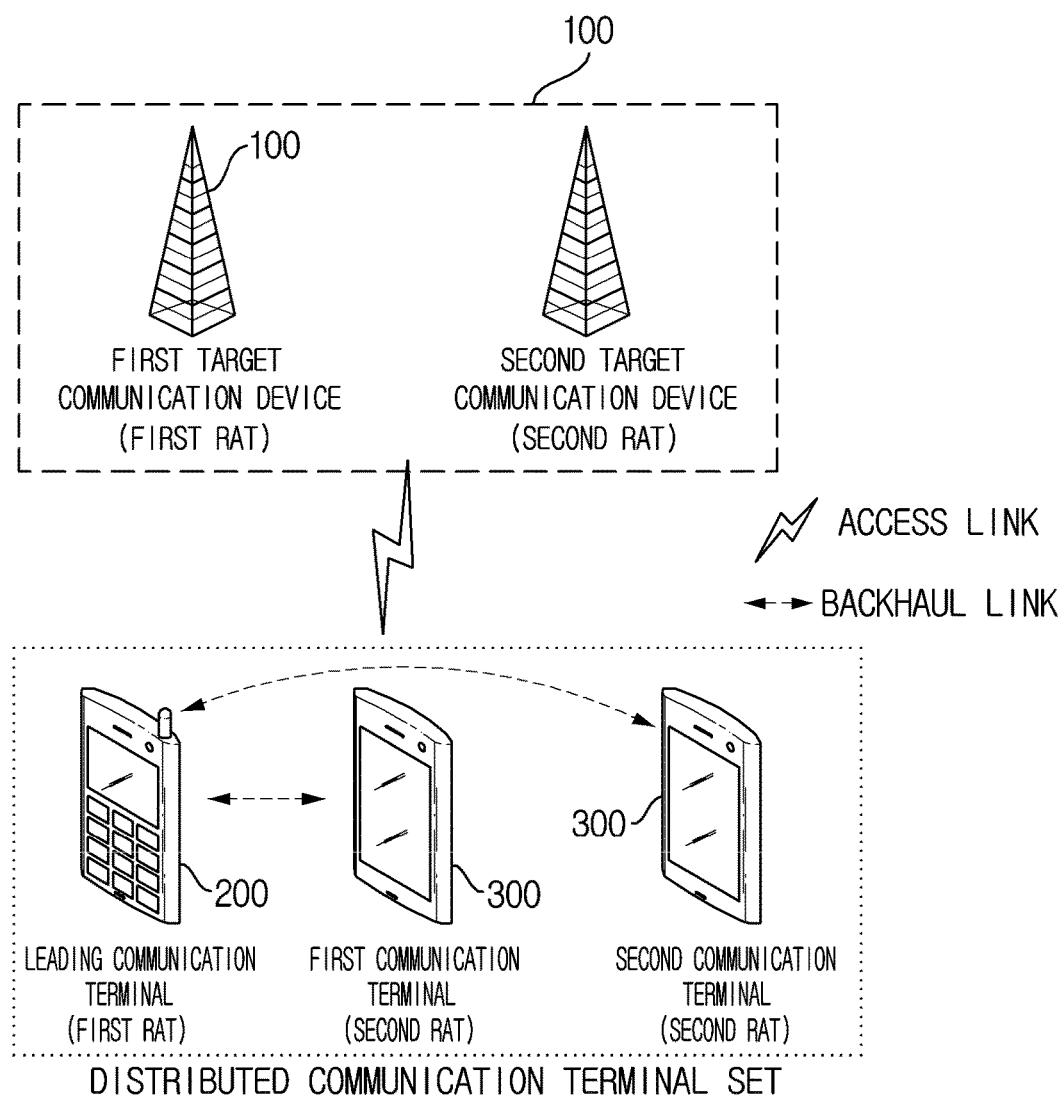

[FIG. 8]
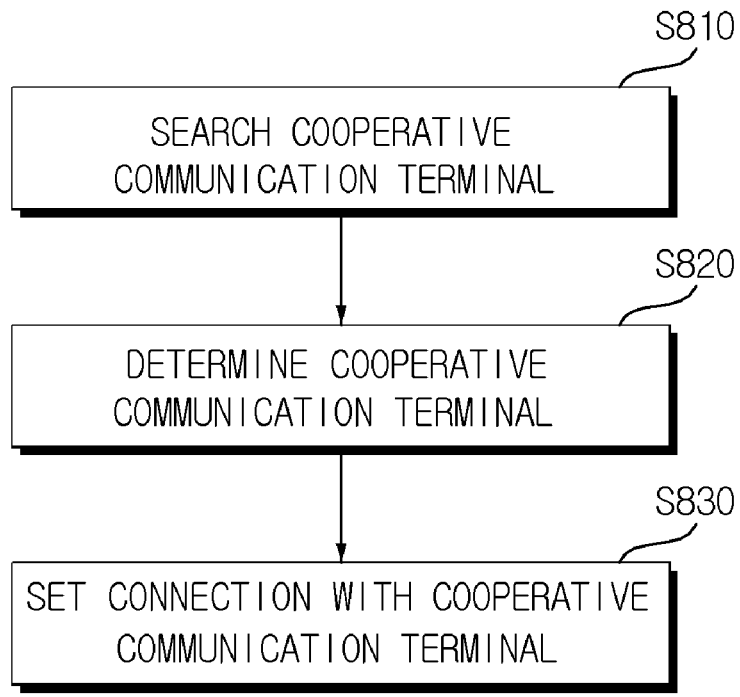
[FIG. 9]
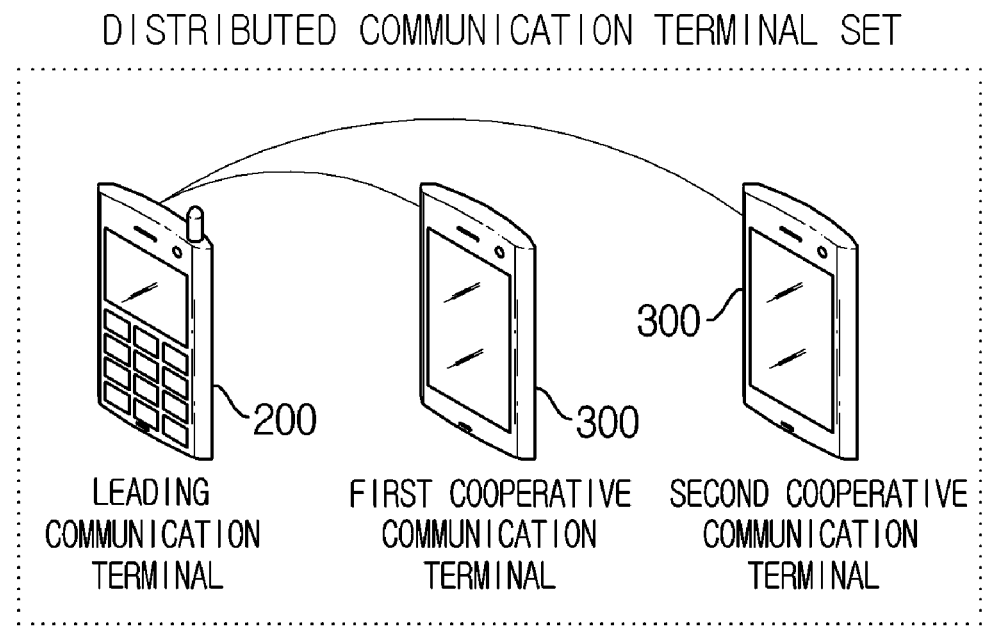

[FIG. 10]
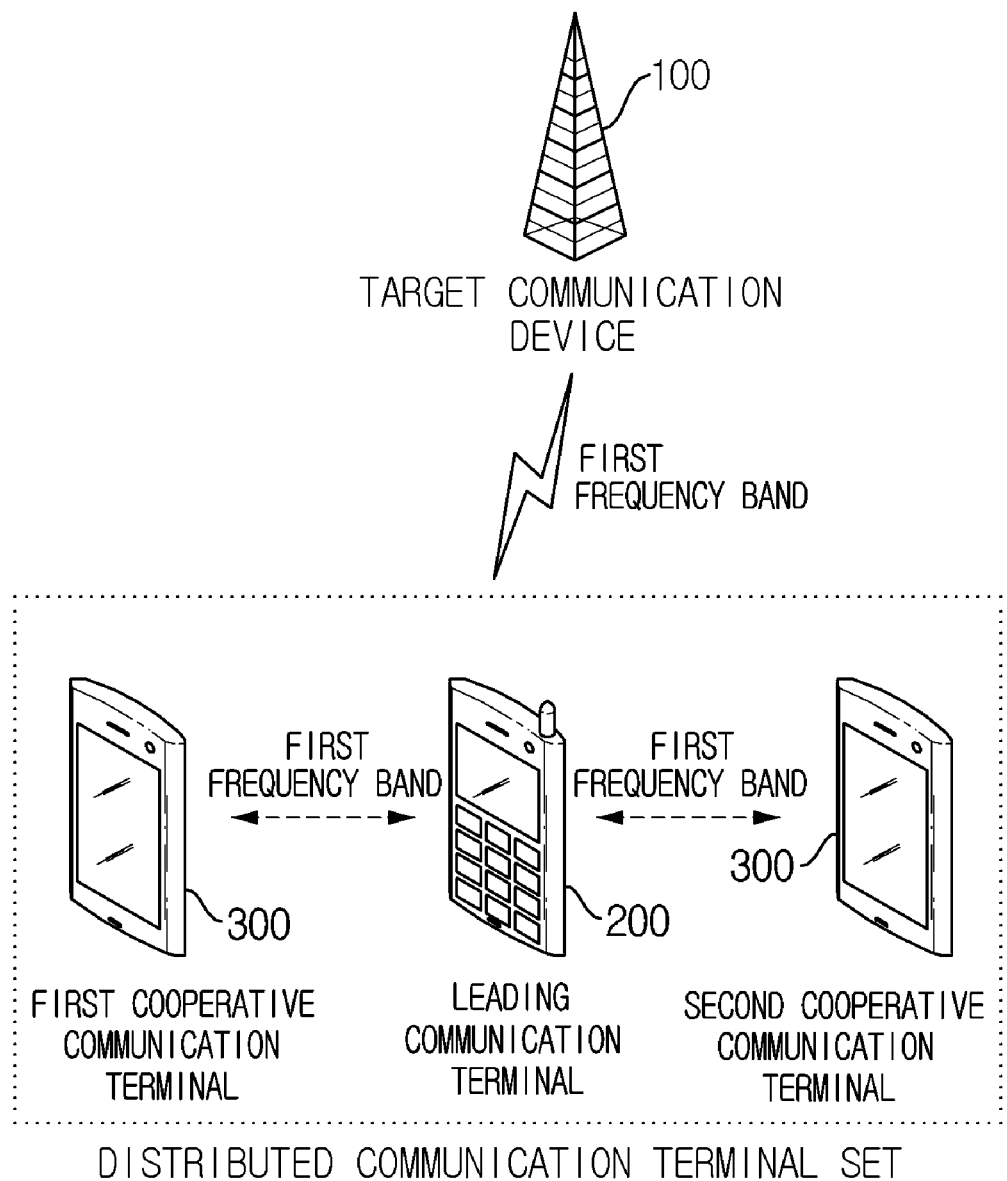

[FIG. 11]
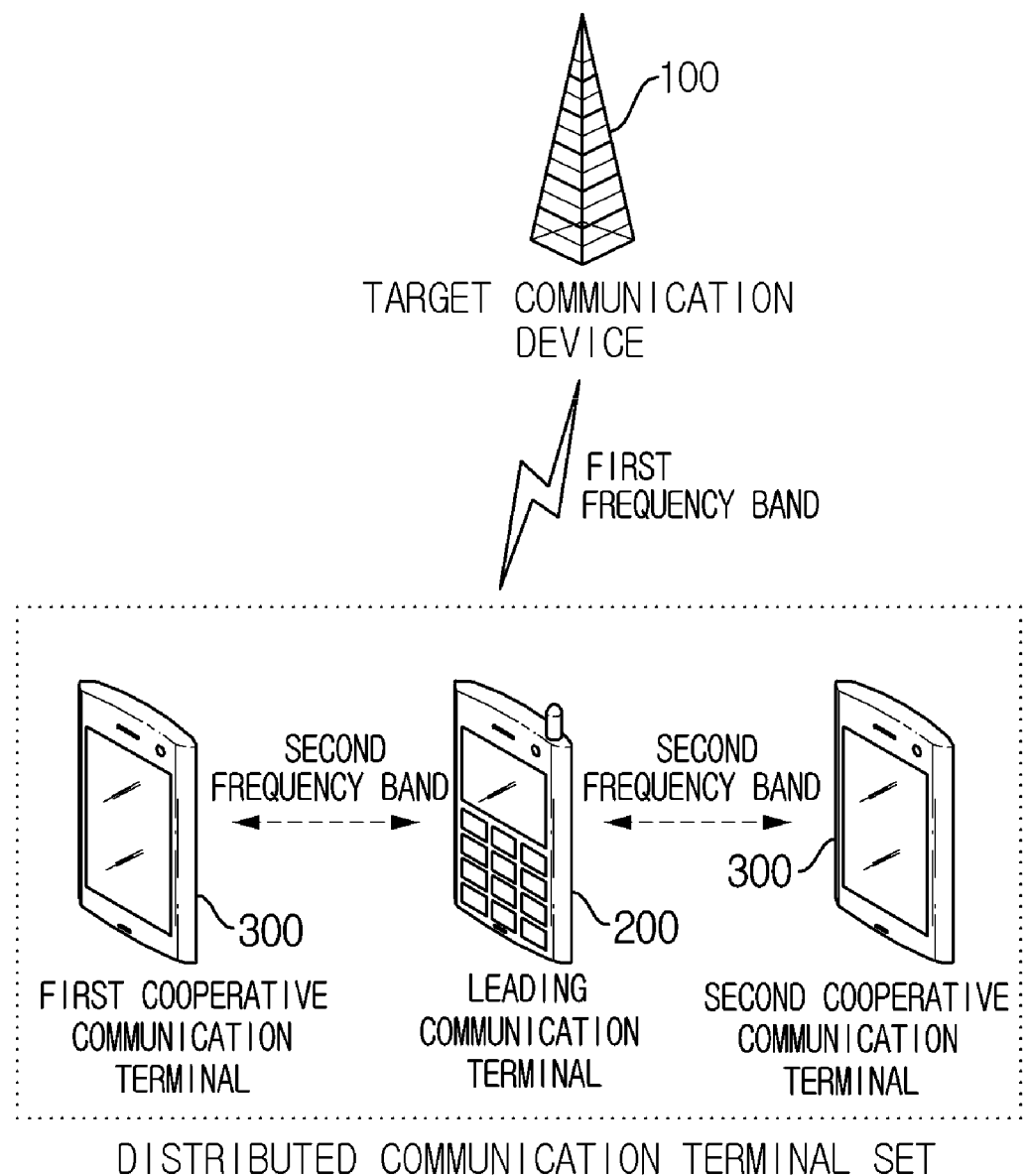

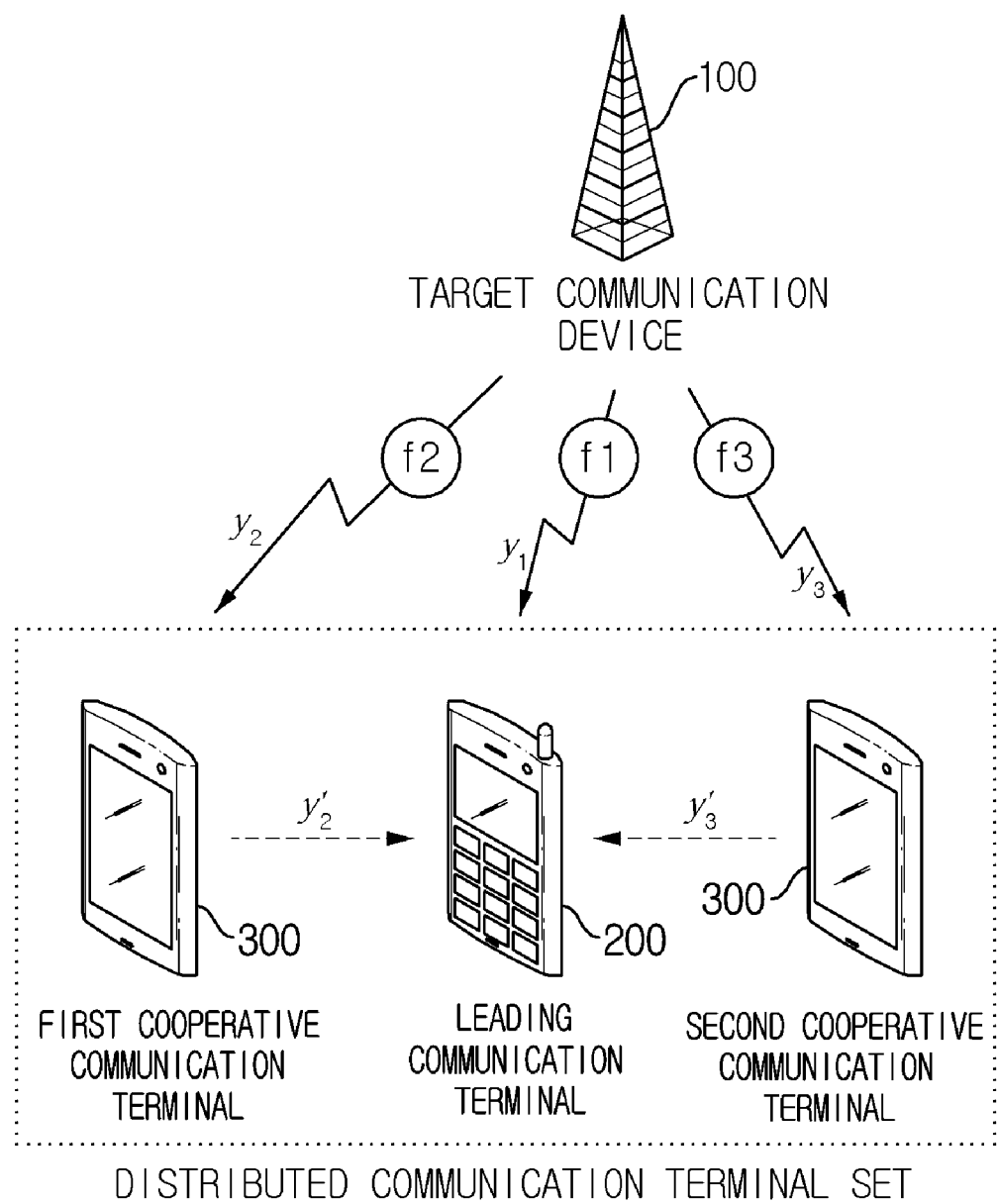
[FIG. 12]

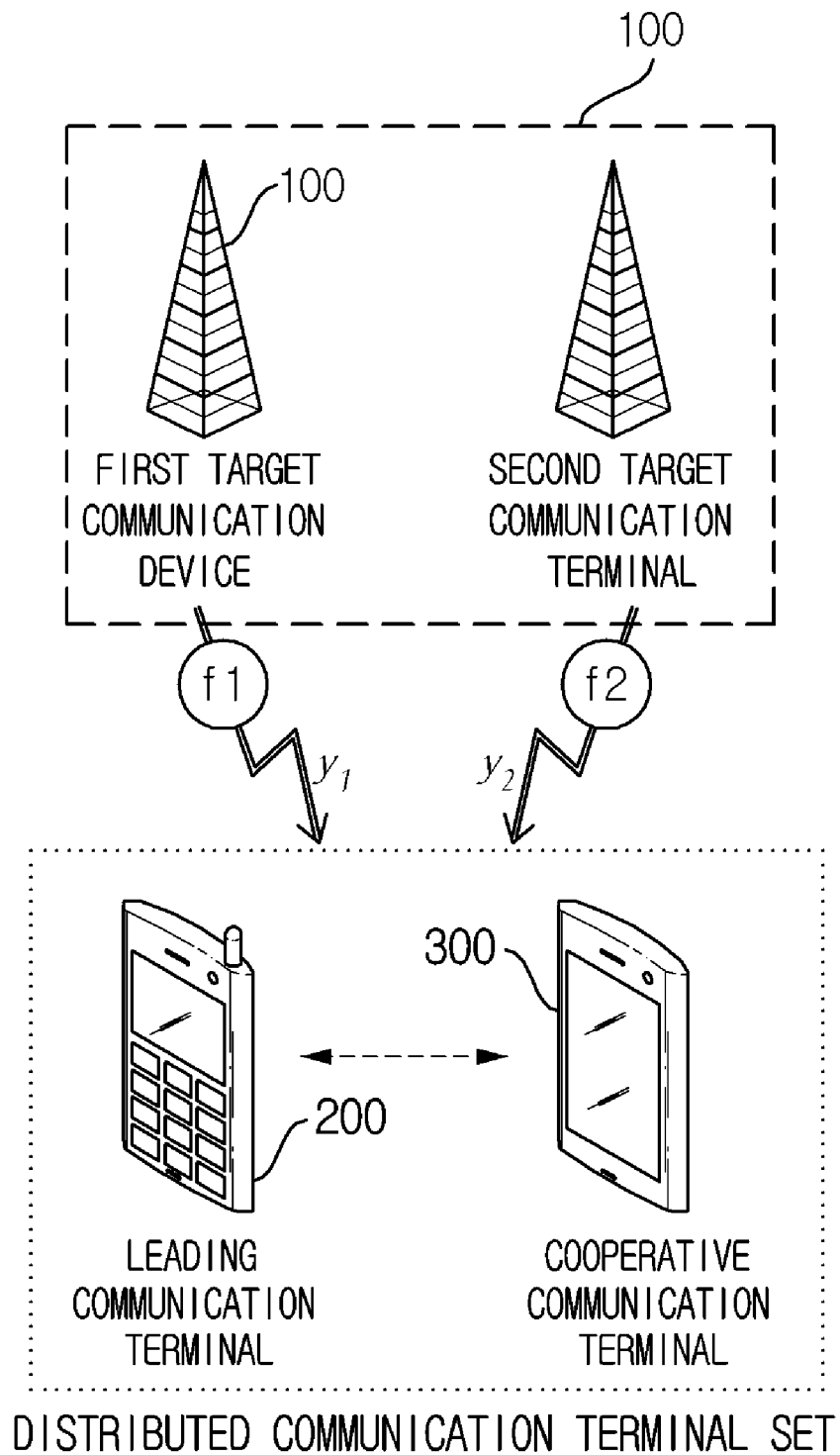
[FIG. 13]

[FIG. 14]
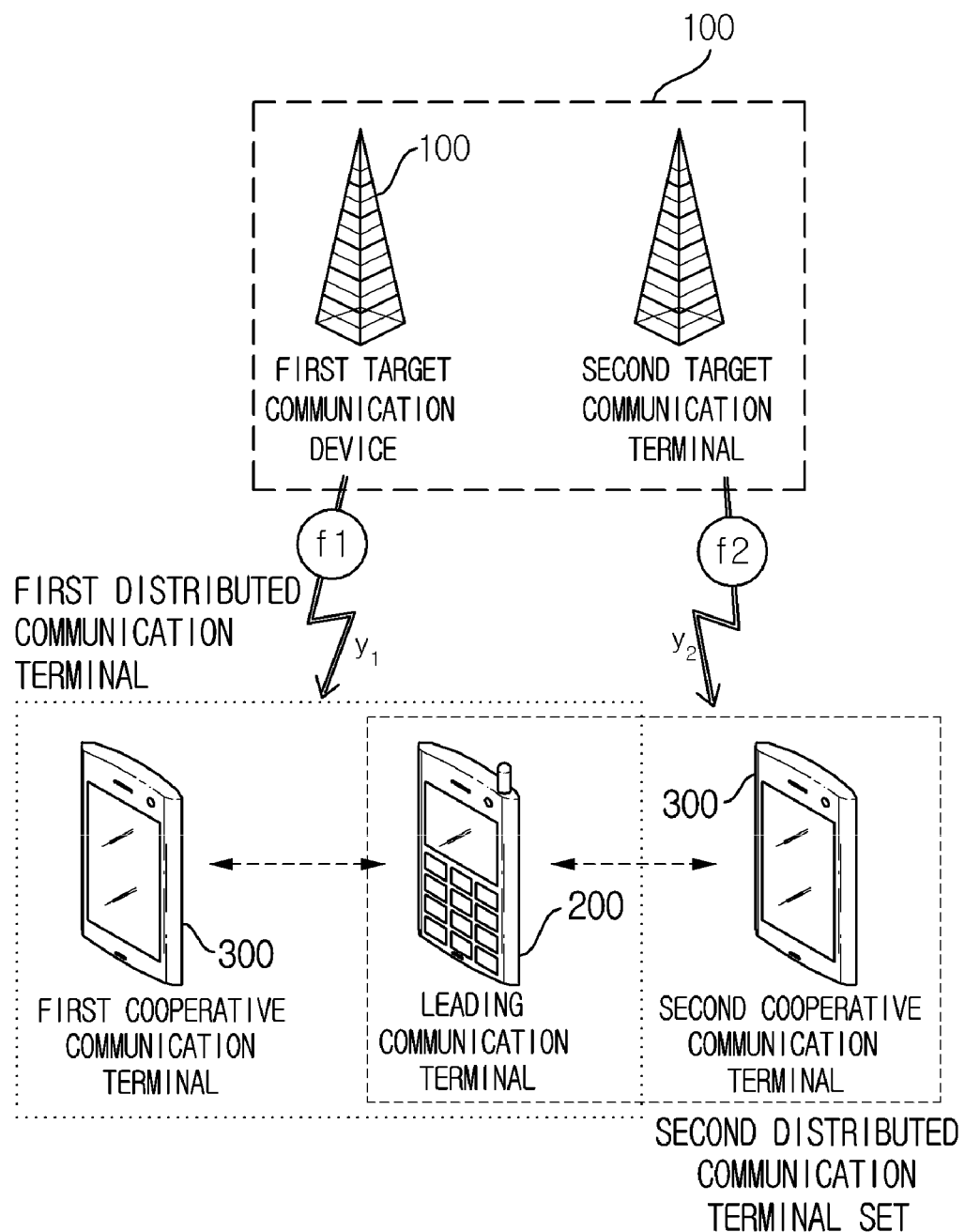

[FIG. 15]
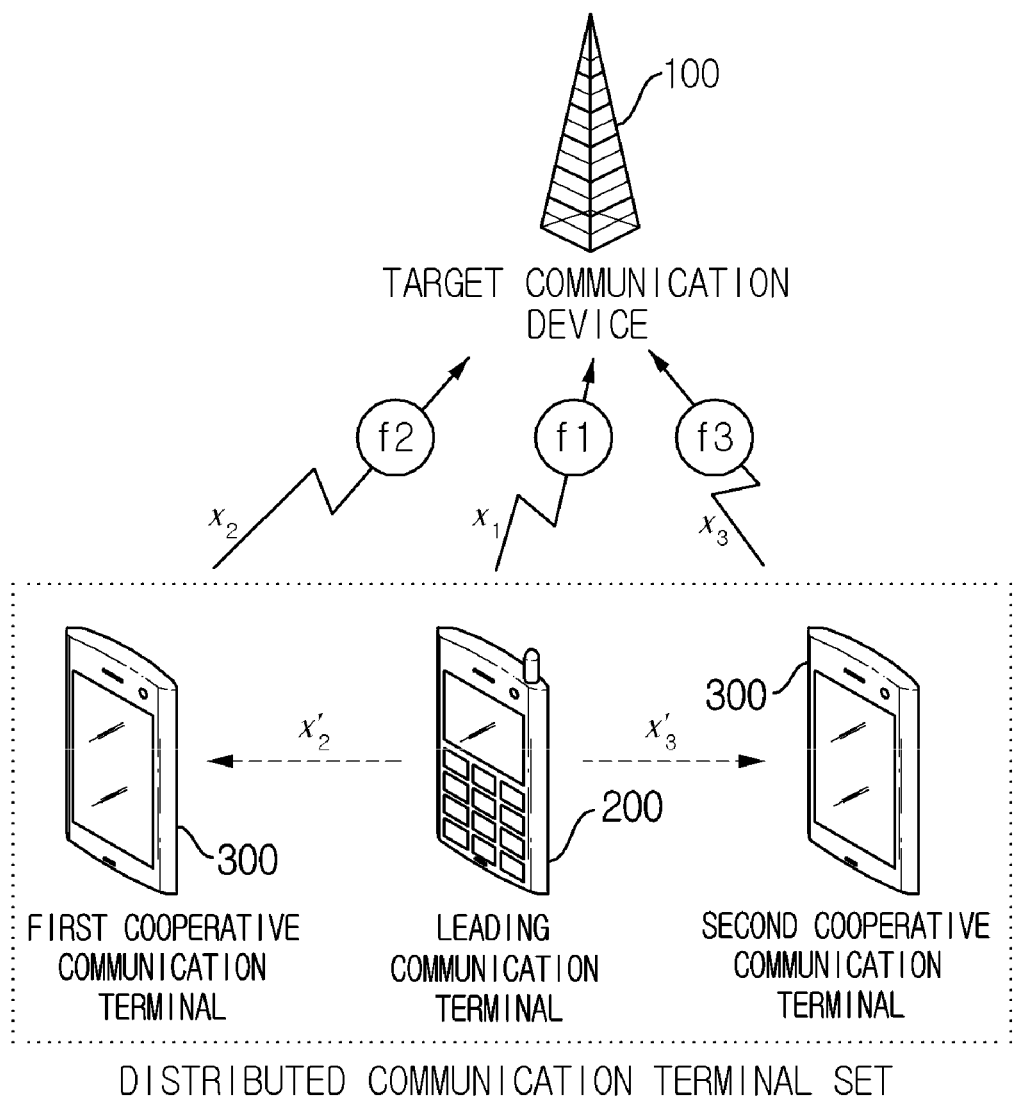

[FIG. 16]
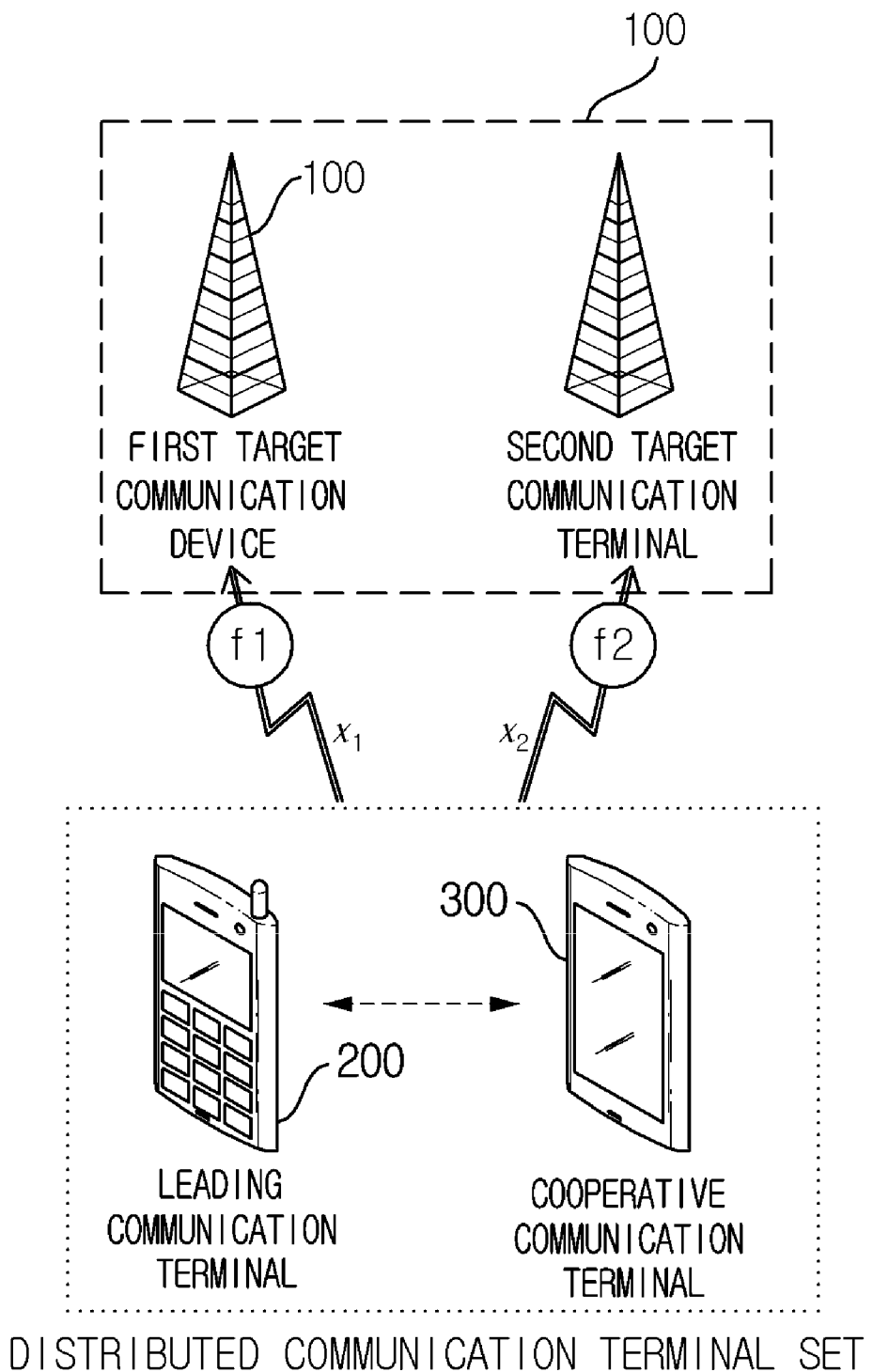

[FIG. 17]
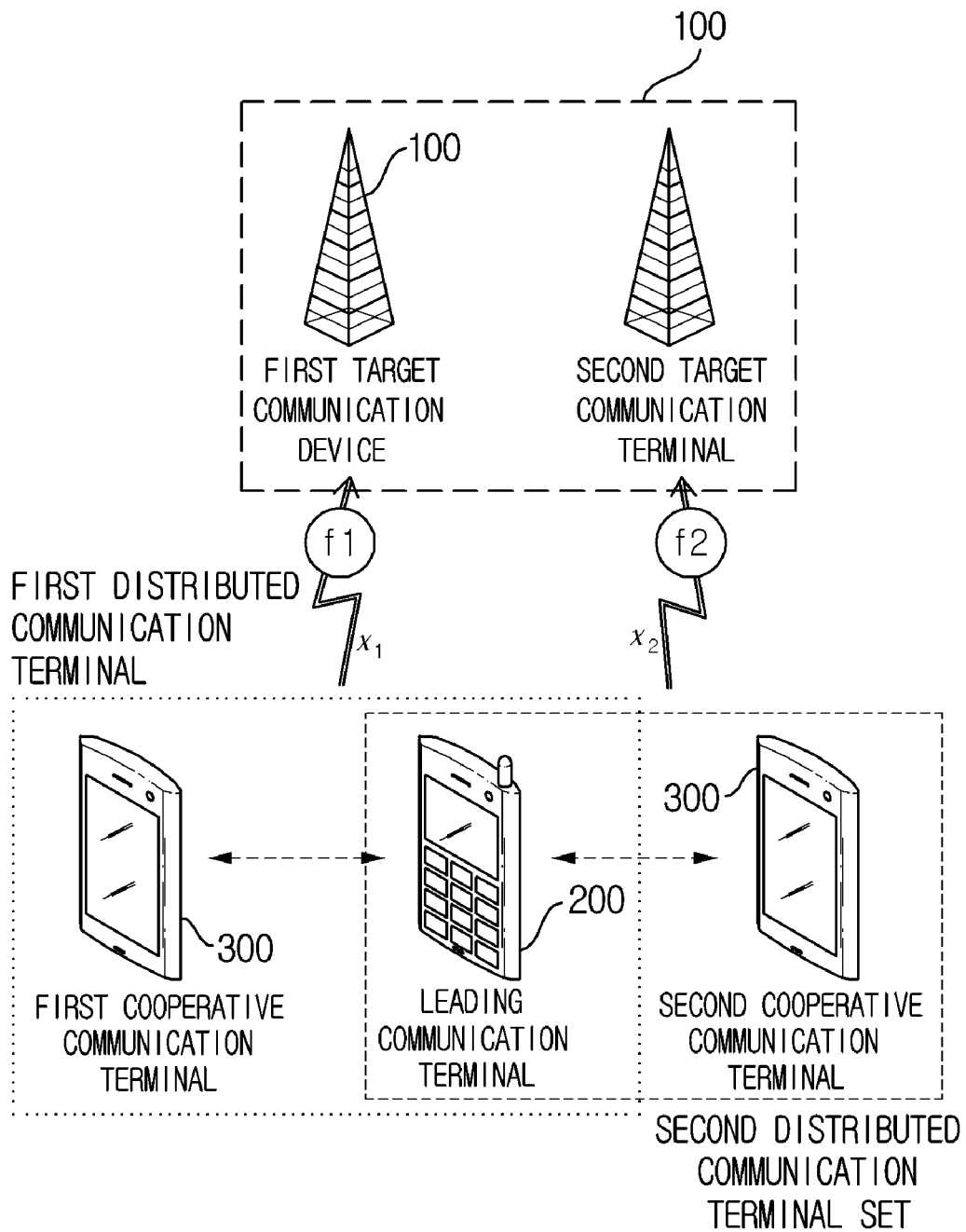

[FIG. 18]
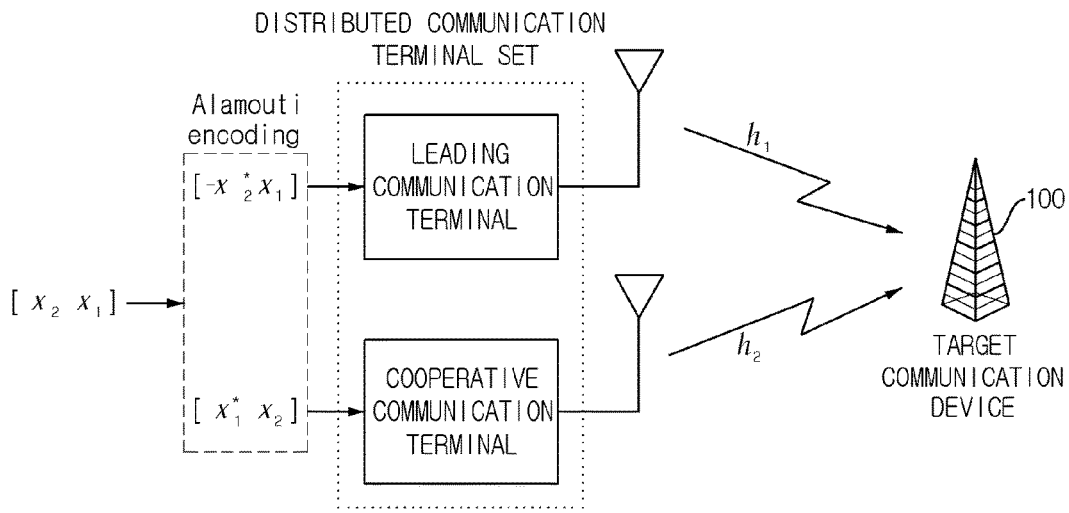
[FIG. 19]
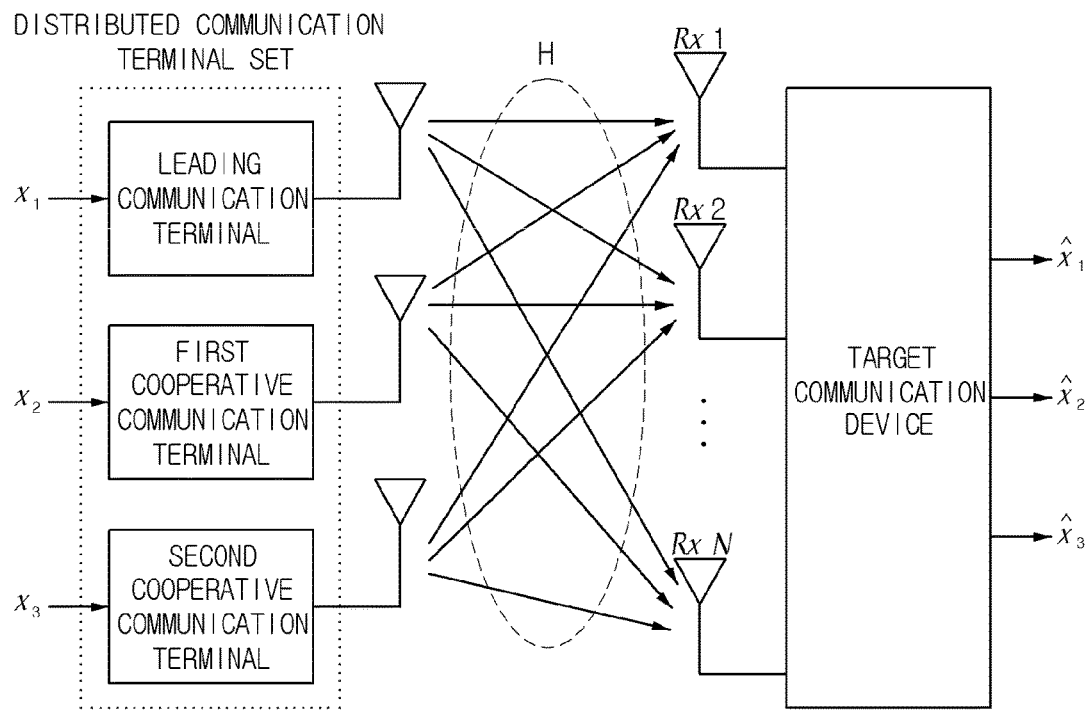

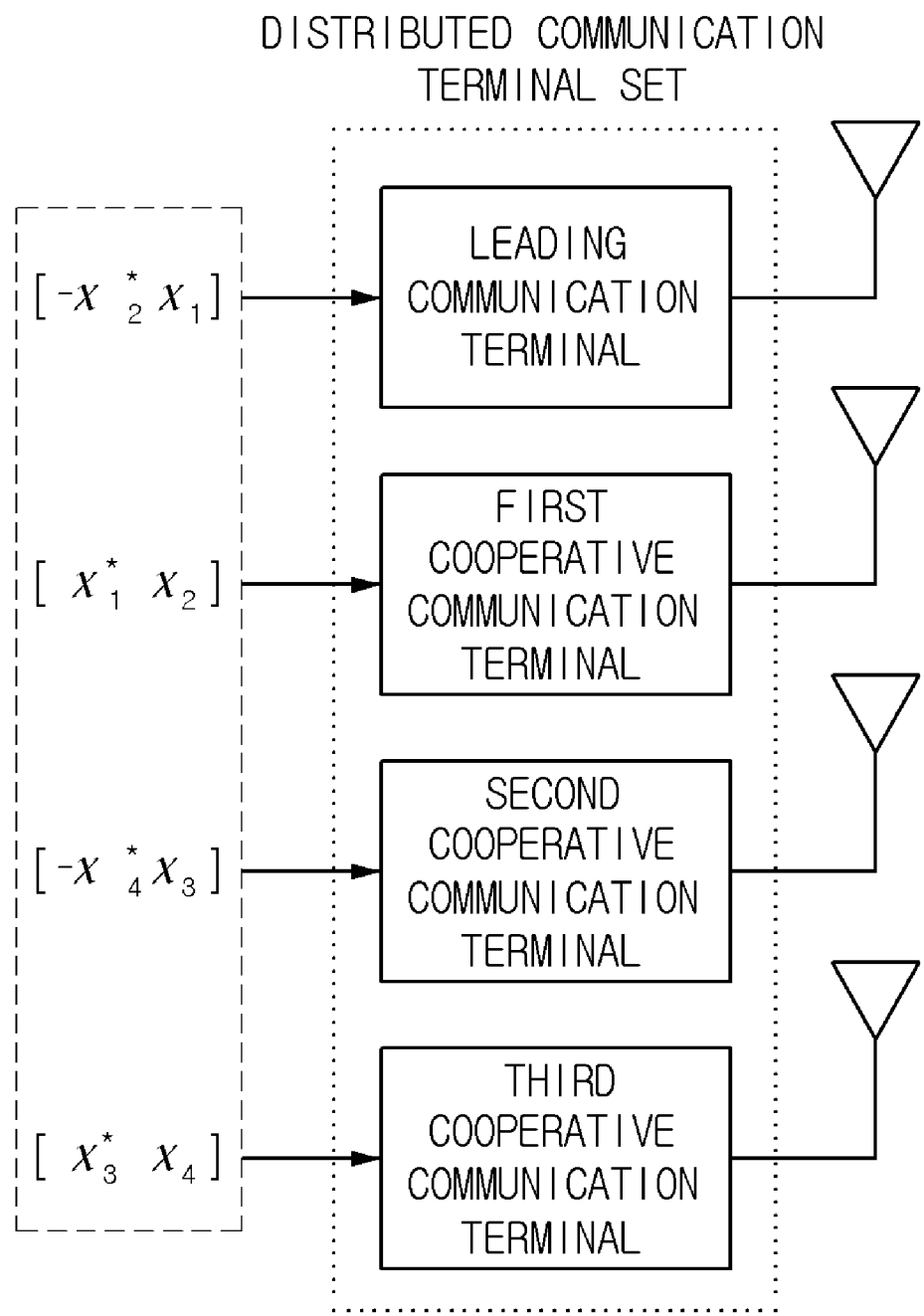

[FIG. 21]
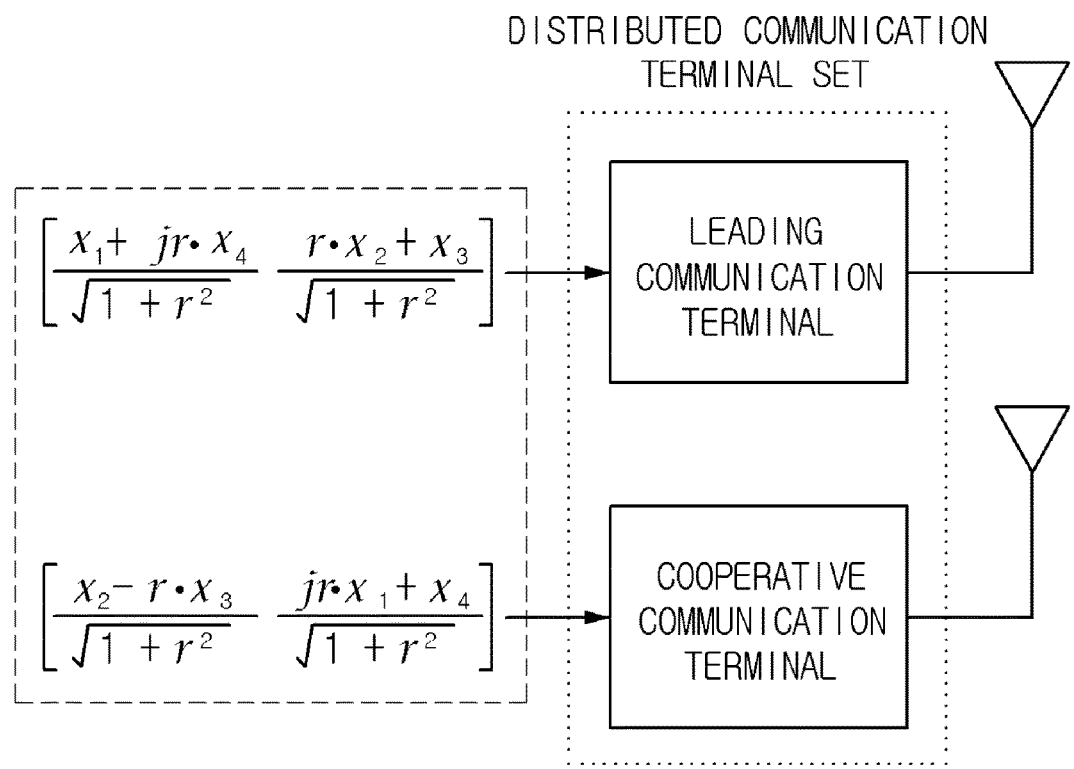

[FIG. 22]
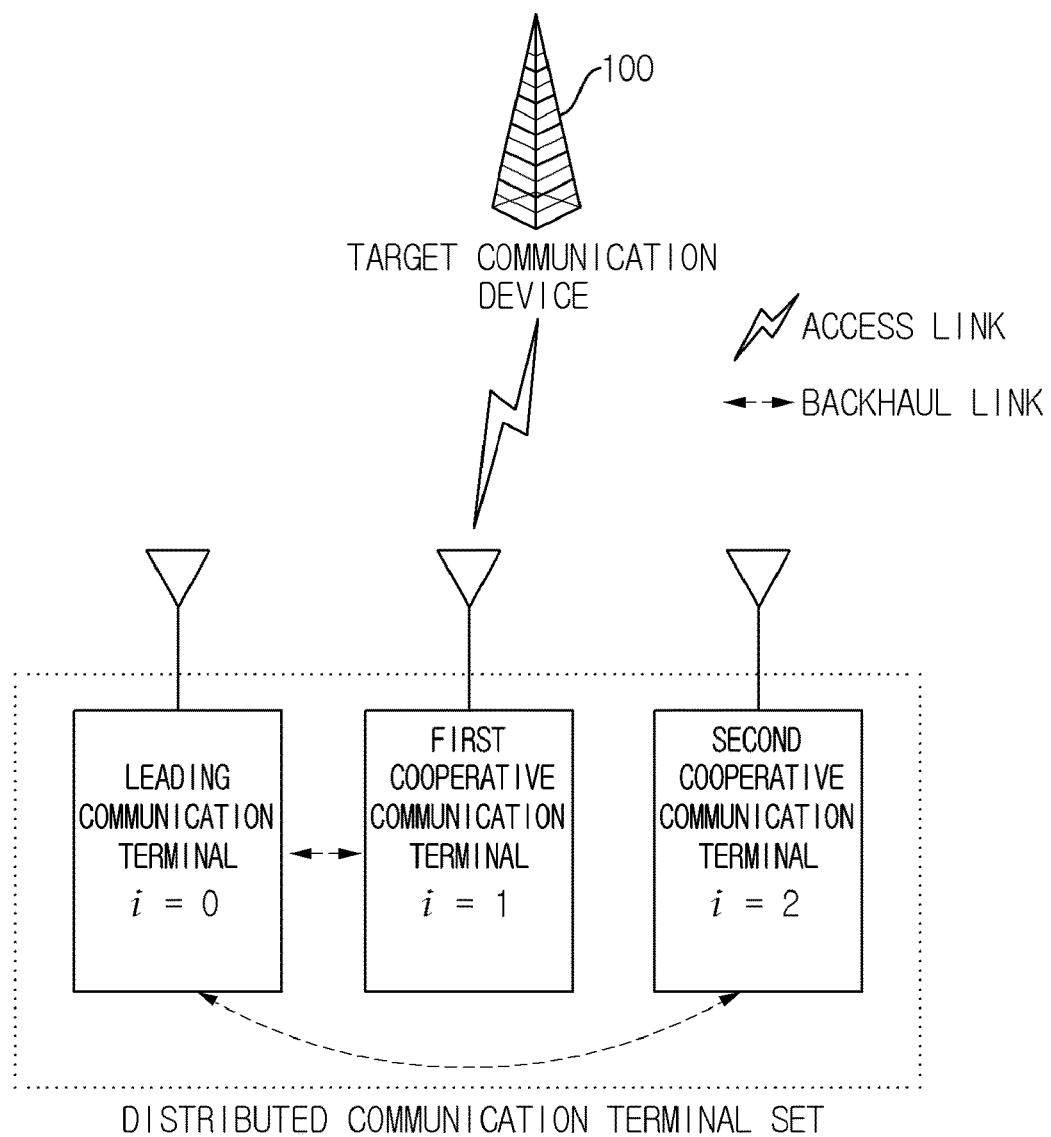

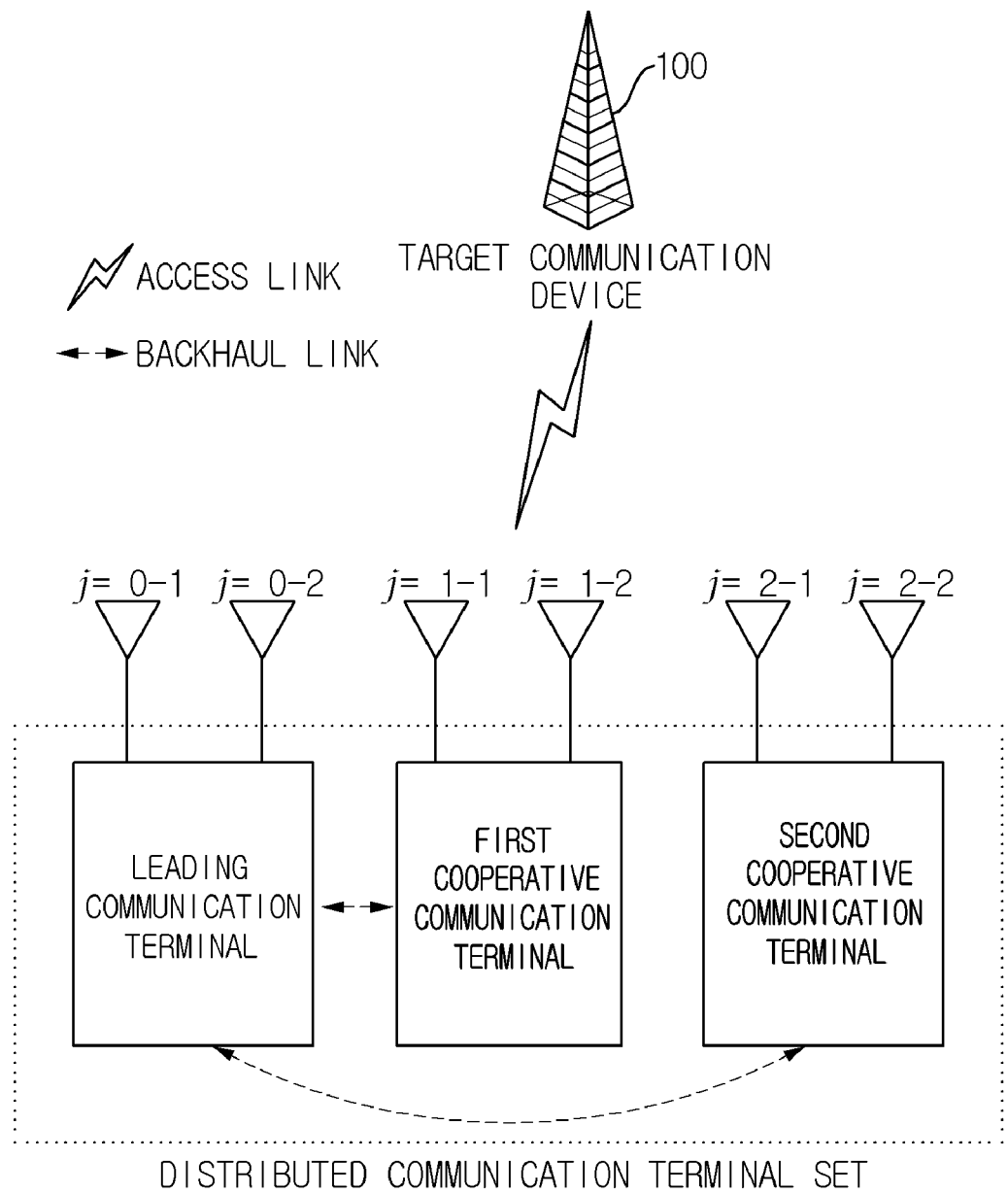
[FIG. 23]

[FIG. 24]
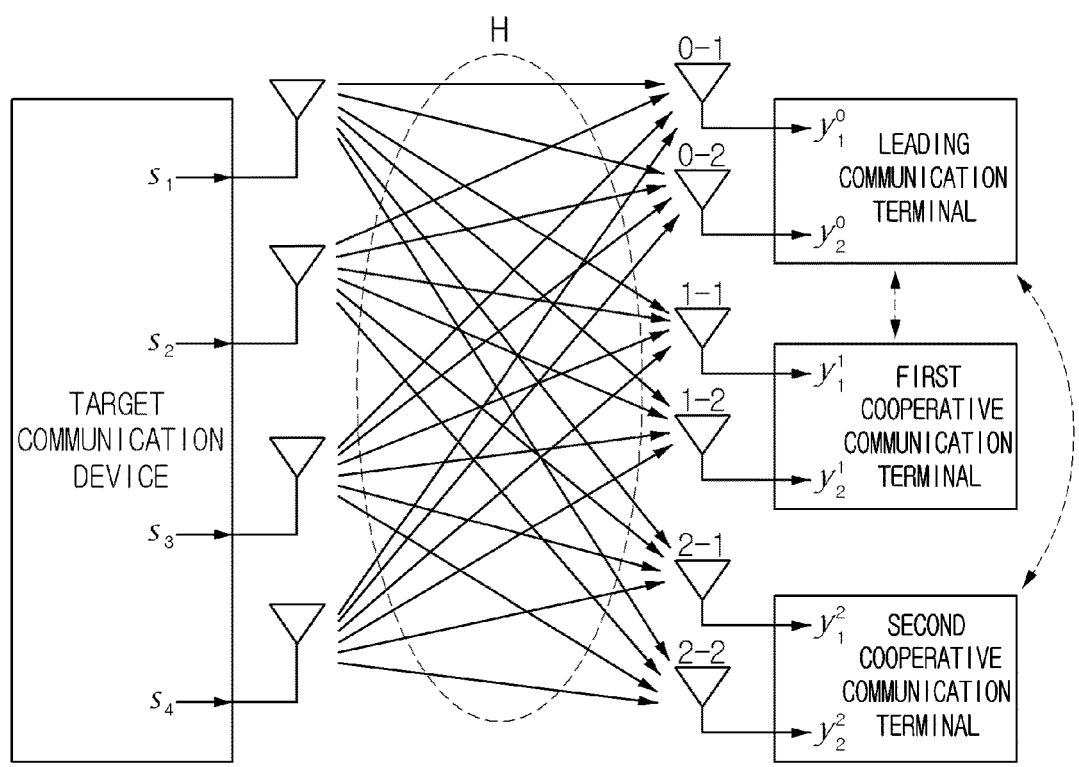

[FIG. 25]
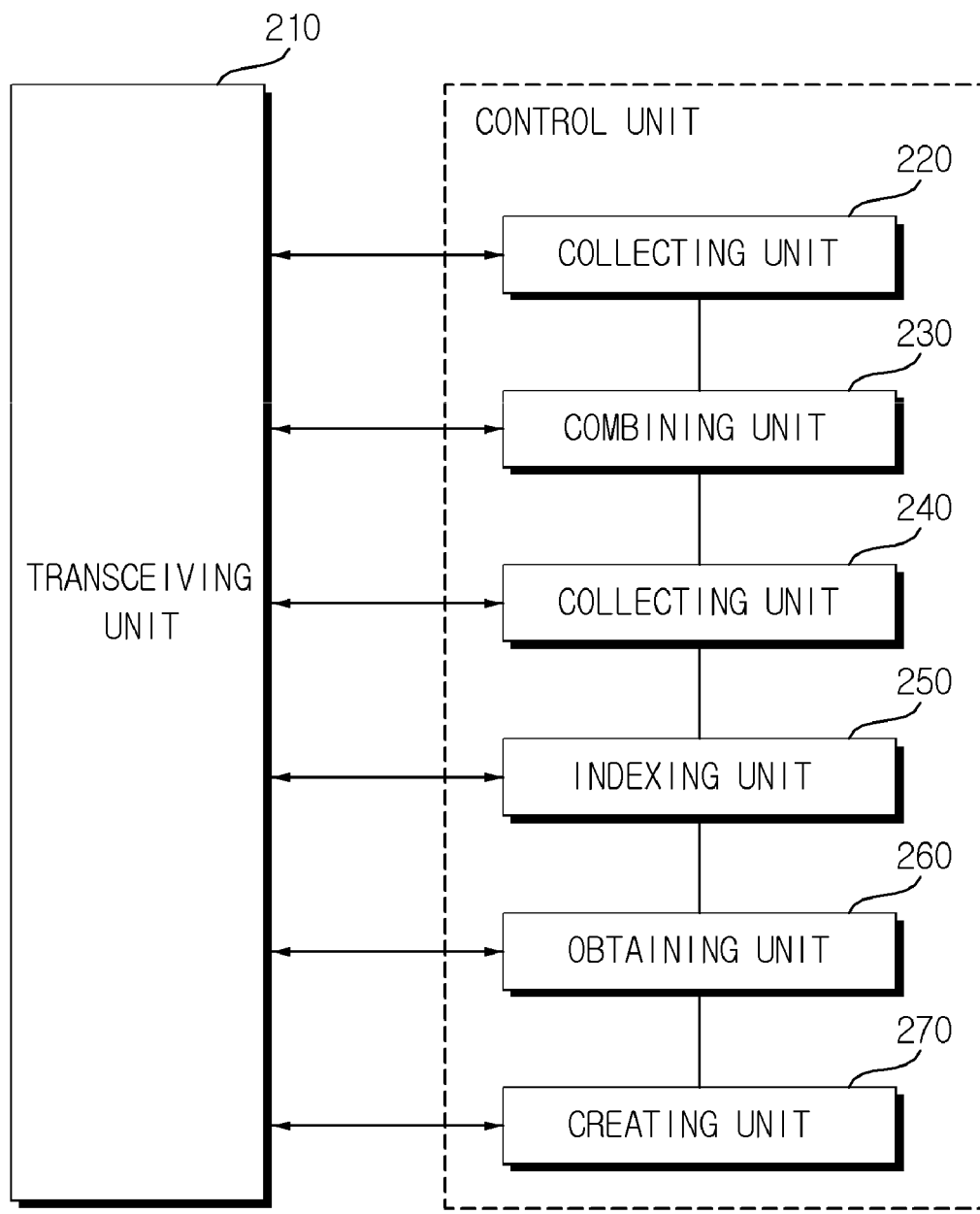

COMMUNICATION TERMINAL FOR PERFORMING DISTRIBUTED COMMUNICATION IN COMMUNICATION SYSTEM AND COMMUNICATION METHOD FOR SAME

TECHNICAL FIELD

The present invention relates to a distributed communication method, and more particularly, to a communication terminal in which at least one terminal forms a backhaul link with at least one cooperative communication terminal and communicates with at least one target communication device such as a base station or a repeater under cooperation of the at least one cooperative communication terminal which forms the backhaul link and a communication method thereof.

BACKGROUND ART

A demand on a multimedia service which requires high quality, high capacity, and high transmission rate is rapidly increased in a recent wireless communication system but it is limited to guarantee requirements of a user with the communication performance of a single communication terminal when considering portability, power consumption, or price.

Specifically, even though various techniques which improve a communication performance such as a multiple input multiple output (MIMO) technique, a diversity transmission technique, or a multiplex-transmission technique, have been developed, it is difficult to apply the technique to the communication terminal due to problems in portability, power consumption, or price.

SUMMARY OF THE INVENTION

The present invention has been made in an effort to provide a communication terminal in which at least one terminal forms a backhaul link with at least one cooperative communication terminal and communicates with at least one target communication device such as a base station or a repeater under cooperation with the at least one cooperative communication terminal which forms the backhaul link and a communication method thereof.

However, an object of the present invention is not limited to the above description and other objects which have not been mentioned above will be more apparent to those skilled in the art from a reading of the following description.

An aspect of the present invention provides a communication method which performs distributed communication in a communication system, including: receiving, by a first communication terminal, at least one first signal from at least one target communication device; collecting, by the first communication terminal, at least one second signal which is received from the at least one target communication device by at least one second communication terminal or collecting, by the first communication terminal, at least one third signal which is obtained by processing the at least one second signal through a preset processing scheme by the at least one second communication terminal; and combining, by the first communication terminal, the at least one first signal and the at least one second signal or combining, by the first communication terminal, the at least one first signal and the at least one third signal.

The present invention may further include: establishing, by the first communication terminal, a backhaul link with each of the at least one second communication terminal which performs distributed communication with the at least one target communication device.

The present invention may further include: transmitting, by the first communication terminal, selecting at least one second candidate communication terminal to transmit the selected at least one second candidate communication terminal to the at least one target communication device; and determining, by the first communication terminal, the at least one second communication from the at least one second candidate communication terminal.

The present invention may further include: tentatively determining, by the first communication terminal, the at least one second communication terminal to transmit the at least one second communication terminal which is tentatively determined to the at least one target communication device; and approving, by the at least one target communication device, the at least one second communication terminal which is tentatively determined.

The first communication terminal may determine the at least one second candidate communication terminal or the at least one second communication terminal using at least one of a backhaul link characteristic, an access link characteristic, and a communication terminal radio access technology (RAT) characteristic.

The present invention may further include: indexing, by the first communication terminal, each of the first communication terminal and the at least one second communication terminal or indexing, by the first communication terminal, each of at least one antenna which is equipped in the first communication terminal and at least one antenna which is equipped in the at least one second communication terminal.

The backhaul link may include at least one of a wired backhaul link and a wireless backhaul link and the wireless backhaul link includes at least one of an in-band backhaul link and an out-band backhaul link.

The preset processing scheme may include at least one of a receiving scheme, a demodulating scheme, a decoding scheme, and a hybrid automatic repeat requests (HARQ) scheme.

At least one of RATs of the first communication terminal and at least one of RATs of the at least one second communication terminal may be same or different from each other.

At least one of the first communication terminal and the at least one second communication terminal may use the same resource or different resources.

The first communication terminal may receive one of the same information, different information, mixed information, the same signal, and different signals from each of as at least two of a plurality of target communication devices.

In the collecting of at least one signal, the first communication terminal may collect at least one second signal which is received from a part of target communication devices among a plurality of target communication devices by the at least one second communication terminal or collect at least one third signal which is obtained by processing the at least one second signal, which is received from the part of target communication devices by the at least one second communication terminal, through the preset processing scheme, and the first communication terminal collects at least one second signal which is received from another part of the target communication devices among the plurality of target communication devices by the at least one second communication terminal or at least one third signal which is obtained by processing the at least one second signal, which is received from another part of the target communication devices by the at least one second communication terminal, through the preset processing scheme.

The first communication terminal may collect at least one second signal which is received from the part of target communication devices among the plurality of target communication devices by a part of communication terminals among at least one second communication terminal or at least one third signal which is obtained by processing at least one second signal, which is received from the part of target communication devices by the part of communication terminals, by the preset processing scheme, and the first communication terminal may collect at least one second signal which is received from another part of the target communication devices among a plurality of target communication devices by another part of the second communication terminals or collect at least one third signal which is obtained by processing the at least one second signal, which is received from another part of the target communication devices by the another part of the second communication terminals, through the preset processing scheme.

In the collecting of at least one signal, the first communication terminal may ask the at least one second communication terminal for the at least one signal or the at least one second communication terminal may provide the at least one signal to the first communication terminal.

The first communication terminal may communicate with at least two of a plurality of target communication devices using the same resource or different resources.

RATs of at least two of the plurality of target communication devices may be same or RATs of the at least two target communication devices may be different from each other.

In the combining, the first communication terminal may combine the at least one first signal and the at least one second signal or the at least one first signal and the at least one third signal using any one of a diversity combining method, a multiplex-combining method, a cooperative combining method, and a hybrid combining method.

The at least one first signal and the at least one second signal or the at least one third signal may be any one of the same information, different information, and mixed information.

In the combining of at least two signals, at least one signal which is obtained by processing the at least one first signal using the same scheme as the preset processing scheme through which the at least one third signal is obtained may be combined with the at least one third signal.

The present invention may further include: obtaining, by the first communication terminal, channel state information by directly measuring channel state information between the first communication terminal and the at least one target communication device and between the at least one second communication terminal and the at least one target communication device using signals which are directly received by the first communication terminal and a part of received signals collected from the at least one second communication terminal or obtaining, by the first communication terminal, channel state information by directly measuring a part of channel state information between the first communication terminal and the at least one second communication terminal and the at least one target communication device using signals which are directly received by the first communication terminal and a part of received signals collected from a part of the at least one second communication terminal and receiving another part of the channel state information from another part of the second communication terminal among the at least one second communication terminal.

Another aspect of the present invention provides a communication method which performs distributed communication in a communication system, including creating, by a first communication terminal, at least one first signal to be directly transmitted to at least one target communication device, at least one second signal to be distributively transmitted to at least one second communication terminal, or creating, by the first communication terminal, at least one third signal which is required to create the at least one second signal by performing a preset processing scheme; transmitting, by the first communication terminal, the created at least one first signal to the at least one target communication device; and providing, by the first communication terminal, the created at least one second signal or at least one third signal to the at least one second communication terminal.

The present invention may further include: establishing, by the first communication terminal, a backhaul link with each of the at least one second communication terminal which performs distributed communication with the at least one target communication device.

The present invention may further include: transmitting, by the first communication terminal, selecting at least one second candidate communication terminal to transmit the selected at least one second candidate communication terminal to the at least one target communication device; and determining, by the first communication terminal, the at least one second communication from the at least one second candidate communication terminal.

The present invention may further include: tentatively determining, by the first communication terminal, the at least one second communication terminal to transmit the at least one second communication terminal which is tentatively determined to the at least one target communication device; and approving, by the at least one target communication device, the at least one second communication terminal which is tentatively determined.

The first communication terminal may determine the at least one second candidate communication terminal or the at least one second communication terminal using at least one of a backhaul link characteristic, an access link characteristic, and a communication terminal RAT characteristic.

The present invention may further include: indexing, by the first communication terminal, the first communication terminal and the at least one second communication terminal or indexing at least one antenna which is equipped in the first communication terminal and at least one antenna which is equipped in the at least one second communication terminal.

The backhaul link may include at least one of a wired backhaul link and a wireless backhaul link and the wireless backhaul link includes at least one of an in-band backhaul link and an out-band backhaul link.

In the creating of at least one third signal by the first communication, the at least one third signal may include at least one of a transmitting method, a transmission resource, a modulating method, an encoding method, a transmission time, a carrier frequency, a transmission sequence, an information processing method, transmission data, a modulated signal, and an encoded signal.

At least one of RATs of the first communication terminal and at least one of RATs of the at least one second communication terminal may be same or different from each other.

At least one of the first communication terminal and the at least one second communication terminal may use the same resource or different resources.

The first communication terminal may transmit one of the same information, different information, mixed information, the same signal, and different signals from each of at least two of a plurality of target communication devices.

In the creating of at least one signal, the first communication terminal may create at least one first signal or create at least one third signal which is required to create the at least one second signal by performing a preset processing scheme to be distributively transmitted to the part of target communication devices among a plurality of target communication devices through at least one second communication terminal and create at least one second signal to be distributively transmitted to another part of the target communication devices among the plurality of target communication devices through the at least one second communication terminal or at least one third signal which is required to create the at least one second signal by performing a preset processing scheme.

The first communication terminal may create at least one second signal or at least one third signal which is required to create the at least one second signal by performing a preset processing scheme to be distributively transmitted to the part of target communication devices among a plurality of target communication devices through a part of the at least one second communication terminal and create at least one second signal or create at least one third signal which is required to create the at least one second signal by performing a preset processing scheme to be distributively transmitted to another part of the target communication devices among the plurality of target communication devices through another part of the second communication terminal among the at least one second communication terminal.

The first communication terminal may communicate with at least two of a plurality of target communication devices using the same resource or different resources.

RATs of at least two of the plurality of target communication devices may be same or RATs of the at least two target communication devices may be different from each other.

In the creating of at least one signal, the first communication terminal may create the at least one first signal and the at least one second signal or the at least one first signal and the at least one third signal using any one of diversity transmission, multiplex transmission, and hybrid transmission.

The at least one first signal and the at least one second signal or the at least one first signal and the at least one third signal may be any one of the same information, different information, and mixed information.

The present invention may further include: obtaining, by the first communication terminal, channel state information by directly measuring channel state information between the first communication terminal and the at least one target communication device and between the at least one second communication terminal and the at least one target communication device using signals which are directly received by the first communication terminal and a part of received signals collected from the at least one second communication terminal or obtaining, by the first communication terminal, channel state information by directly measuring a part of channel state information between the first communication terminal and the at least one target communication device and between the at least one second communication terminal and the at least one target communication device using signals which are directly received by the first communication terminal and the part of received signals collected from a part of the at least one second communication terminal among the at least one second communication terminal and by being offered another part of the channel state information from another part of the second communication terminal among the at least one second communication terminal.

Another aspect of the present invention provides a communication system in which a communication terminal communicates with at least one target communication device under cooperation of at least one cooperative communication terminal, the communication terminal including: a transceiving unit which receives at least one first signal from the at least one target communication device; a collecting unit which collects at least one second signal, which is received from the at least target communication device by the at least one cooperative communication terminal or at least one third signal which is obtained by processing the at least one second signal through the preset processing scheme, by the at least one cooperative communication terminal; and a combining unit which combines the received at least one first signal and the collected at least one second signal or the at least one first signal and the at least one third signal.

The present invention may further include an establishing unit which establishes a backhaul link with each of the at least one cooperative communication terminal which distributively communicates with the at least one target communication device.

Further, the present invention may further include an establishing unit which selects at least one candidate cooperative communication terminal and transmits the selected at least one candidate cooperative communication terminal to the at least one target communication device and receives the at least one cooperative communication terminal determined among the at least one cooperative communication terminal from the at least one target communication device.

The present invention may further include: an establishing unit which tentatively determines at least one cooperative communication terminal and transmits the tentatively determined at least one cooperative communication terminal to the at least one target communication device and receives approval for the at least one cooperative communication terminal which is tentatively determined from the at least one target communication device.

The establishing unit may determine the at least one cooperative communication terminal which distributively communicates with the at least one target communication device using at least one of a backhaul link characteristic, an access link characteristic, and a communication terminal RAT characteristic.

The present invention may further include: an indexing unit which indexes the communication terminal and the at least one cooperative communication terminal or at least one antenna which is equipped in the leading communication terminal and at least one antenna which is equipped in the at least one cooperative communication terminal. The backhaul link may include at least one of a wired backhaul link and a wireless backhaul link and the wireless backhaul link includes at least one of an in-band backhaul link and an out-band backhaul link.

The preset processing scheme may include at least one of a receiving scheme, a demodulating scheme, a decoding scheme, and a hybrid automatic repeat requests (HARQ) scheme.

At least one of RATs of the communication terminal and at least one of RATs of the at least one cooperative communication terminal may be same or different from each other.

At least one of the communication terminal and the at least one cooperative communication terminal may use the same resource or different resources.

The communication terminal may receive one of the same information, different information, mixed information, the same signal, and different signals from each of at least two of a plurality of target communication devices.

The collecting unit may collect at least one second signal which is received from a part of target communication devices among a plurality of target communication devices by the at least one cooperative communication terminal or at least one third signal which is obtained by processing at least one second signal, which is received from the part of target communication devices by the at least one cooperative communication terminal, through the preset processing scheme, and collect at least one second signal which is received from another part of the target communication devices among a plurality of target communication devices by the at least one cooperative communication terminal or at least one third signal which is obtained by processing at least one second signal, which is received from another part of the target communication devices by the at least one cooperative communication terminal, through the preset processing scheme.

The collecting unit may collect at least one second signal which is received from the part of target communication devices among a plurality of target communication devices by a part cooperative communication terminals among at least one cooperative communication terminal or at least one third signal which is obtained by processing at least one second signal, which is received from the part of target communication devices by the part cooperative communication terminals, by the preset processing scheme, and collect at least one second signal which is received from another part of the target communication devices among a plurality of target communication devices by another part of the cooperative communication terminals or at least one third signal which is obtained by processing at least one second signal, which is received from another part of the target communication devices by another part of the cooperative communication terminals, by the preset processing scheme.

The collecting unit may request the at least one second signal or the at least one third signal of the at least one cooperative communication terminal or receive the at least one second signal or the at least one third signal from the at least one cooperative communication terminal.

The communication terminal may communicate with at least two of a plurality of target communication devices using the same resource or different resources.

RATs of at least two of the plurality of target communication devices may be same or RATs of the at least two target communication devices may be different from each other.

The collecting unit may combine the at least one first signal and the at least one second signal or the at least one first signal and the at least one third signal using any one of a diversity combining method, a multiplex-combining method, a cooperative combining method, and a hybrid combining method.

The at least one first signal and the at least one second signal or the at least one third signal may be any one of the same information, different information, and mixed information.

The collecting unit may combine at least one signal which is obtained by processing the at least one first signal using the same scheme as the preset processing scheme through which the at least one third signal is obtained with the at least one third signal.

The present invention may further include: an obtaining unit which obtains channel state information by directly measuring channel state information between the communication terminal and the at least one cooperative communication terminal and the at least one target communication device using signals which are directly received by the communication terminal and a part of received signals collected from the at least one cooperative communication terminal or obtains channel state information by directly measuring a part of channel state information between the communication terminal and the at least one cooperative communication terminal and the at least one target communication device using signals which are directly received by the communication terminal and the part of received signals collected from a part of the at least one cooperative communication terminal among the at least one cooperative communication terminal and by being offered another part of the channel state information from another part of the cooperative communication terminal among the at least one cooperative communication terminal.

Another aspect of the present invention provides a communication system in which a communication terminal communicates with at least one target communication device under cooperation of at least one cooperative communication terminal and the communication terminal may include a creating unit which creates at least one first signal to be directly transmitted to at least one target communication device, at least one second signal to be distributively transmitted to at least one cooperative communication terminal, or at least one third signal which is required to create the at least one second signal by performing a preset processing scheme; and a transceiving unit which transmits at least one created first signal to the at least one target communication device and provide the at least one second signal or at least one third signal which are created to at least one cooperative communication terminal.

The present invention may further include an establishing unit which establishes a backhaul link with each of the at least one cooperative communication terminal which distributively communicates with the at least one target communication device.

Further, the present invention may further include an establishing unit which selects at least one candidate cooperative communication terminal and transmits the selected at least one candidate cooperative communication terminal to the at least one target communication device and receives the at least one cooperative communication terminal determined among the at least one cooperative communication terminal from the at least one target communication device.

The present invention may further include: an establishing unit which tentatively determines at least one cooperative communication terminal and transmits the tentatively determined at least one cooperative communication terminal to the at least one target communication device and receives approval for the at least one cooperative communication terminal which is tentatively determined from the at least one target communication device.

The establishing unit may determine the at least one cooperative communication terminal which distributively communicates with the at least one target communication device using at least one of a backhaul link characteristic, an access link characteristic, and a communication terminal RAT characteristic and establishes with the determined at least one cooperative communication terminal.

The present invention may further include: an indexing unit which indexes the communication terminal and the at least one cooperative communication terminal or at least one antenna which is equipped in the first communication terminal and at least one antenna which is equipped in the at least one cooperative communication terminal.

The backhaul link may include at least one of a wired backhaul link and a wireless backhaul link and the wireless backhaul link includes at least one of an in-band backhaul link and an out-band backhaul link.

The creating unit may create the at least one third signal so as to include at least one of a transmitting method, a transmission resource, a modulating method, an encoding method, a transmission time, a carrier frequency, a transmission sequence, an information processing method, transmission data, a modulated signal, and an encoded signal.

At least one of RATs of the communication terminal and at least one of RATs of the at least one cooperative communication terminal may be same or different from each other.

At least one of the communication terminal and the at least one cooperative communication terminal may use the same resource or different resources.

The communication terminal may receive one of the same information, different information, mixed information, the same signal, and different signals from each of at least two of a plurality of target communication devices.

The creating unit may create at least one first signal to be distributively transmitted to the part of target communication devices among a plurality of target communication devices through at least one cooperative communication terminal by the communication terminal or at least one third signal which is required to create the at least one second signal by performing a preset processing scheme and create at least one second signal to be distributively transmitted to another part of the target communication devices among the plurality of target communication devices through the at least one cooperative communication terminal or at least one third signal which is required to create the at least one second signal by performing a preset processing scheme.

The creating unit may create at least one first signal to be distributively transmitted to the part of target communication devices among a plurality of target communication devices through the part of cooperative communication terminal among the at least one cooperative communication terminal by the communication terminal or at least one third signal which is required to create the at least one second signal by performing a preset processing scheme and create at least one second signal to be distributively transmitted to another part of the target communication devices among the plurality of target communication devices through another part of the second communication terminal among the at least one second communication terminal or at least one third signal which is required to create the at least one second signal by performing a preset processing scheme.

The first communication terminal may communicate with at least two of a plurality of target communication devices using the same resource or different resources. RATs of at least two of the plurality of target communication devices may be same or RATs of the at least two target communication devices may be different from each other.

The creating unit may create the at least one first signal and the at least one second signal or the at least one first signal and the at least one third signal using any one of diversity transmission, multiplex transmission, and hybrid transmission.

The at least one first signal and the at least one second signal or the at least one third signal may be any one of the same information, different information, and mixed information.

The present invention may further include: an obtaining unit which obtains channel state information by directly measuring channel state information between the communication terminal and the at least one cooperative communication terminal and the at least one target communication device using signals which are directly received by the communication terminal and a part of received signals collected from the at least one cooperative communication terminal or obtains channel state information by directly measuring a part of channel state information between the communication terminal and the at least one cooperative communication terminal and the at least one target communication device using signals which are directly received by the communication terminal and the part of received signals collected from a part of the at least one cooperative communication terminal among the at least one cooperative communication terminal and by being offered another part of the channel state information from another part of the cooperative communication terminal among the at least one cooperative communication terminal.

By doing this, a communication terminal according to an exemplary embodiment of the present invention forms a backhaul link with each of at least one cooperative communication terminal and communicates with at least one target communication device such as a base station or a repeater, distributively with the cooperative communication terminal in which the backhaul link is formed, thereby increasing a transmission rate through distributed transmission multiplexing.

Further, a communication terminal according to an exemplary embodiment of the present invention forms a backhaul link with each of at least one cooperative communication terminal and communicates with at least one target communication device distributively with the cooperative communication terminal in which the backhaul link is formed, thereby improving a signal quality through distributed transmission diversity transceiving.

Further, a communication terminal according to an exemplary embodiment of the present invention forms a backhaul link with each of at least one cooperative communication terminal and communicates with at least one target communication device distributively with the cooperative communication terminal in which the backhaul link is formed, thereby reducing a load of a network.

Further, a communication terminal according to an exemplary embodiment of the present invention forms a backhaul link with each of at least one cooperative communication terminal and communicates with at least one target communication device distributively with the cooperative communication terminal in which the backhaul link is formed, thereby efficiently using a system resource.

Further, a communication terminal according to an exemplary embodiment of the present invention forms a backhaul link with each of at least one cooperative communication terminal and communicates with at least one target communication device distributively with the cooperative communication terminal which forms the backhaul link, thereby allowing an N-screen technique which operates like one communication terminal.

BRIEF DESCRIPTION OF THE DRAWINGS

FIG. 1 is a diagram illustrating a system which provides distributed communication according to an exemplary embodiment of the present invention.

FIG. 2 is a first view illustrating a method for configuring a distributed communication terminal set.

FIG. 3 is a second view illustrating a method for configuring a distributed communication terminal set.

FIG. 4 is a third view illustrating a method for configuring a distributed communication terminal set.

FIG. 5 is a fourth view illustrating a method for configuring a distributed communication terminal set.

FIG. 6 is a fifth view illustrating a method for configuring a distributed communication terminal set.

FIG. 7 is a sixth view illustrating a method for configuring a distributed communication terminal set.

FIG. 8 is a diagram illustrating a method for establishing a backhaul link according to an exemplary embodiment of the present invention.

FIG. 9 is a view illustrating a method for forming a wired backhaul link.

FIG. 10 is a first view illustrating a method for forming a wireless backhaul link.

FIG. 11 is a second view illustrating a method for forming a wireless backhaul link.

FIG. 12 is a first view illustrating a method for receiving a signal in a distributed communication terminal set.

FIG. 13 is a second view illustrating a method for receiving a signal in a distributed communication terminal set.

FIG. 14 is a third view illustrating a method for receiving a signal in a distributed communication terminal set.

FIG. 15 is a first view illustrating a method for transmitting a signal in a distributed communication terminal set.

FIG. 16 is a second view illustrating a method for transmitting a signal in a distributed communication terminal set.

FIG. 17 is a third view illustrating a method for transmitting a signal in a distributed communication terminal set.

FIG. 18 is a view illustrating a signal diversity transmitting method.

FIG. 19 is a view illustrating a signal multiplexing method.

FIG. 20 is a first view illustrating a hybrid transmitting method.

FIG. 21 is a second view illustrating a hybrid transmitting method.

FIG. 22 is a view illustrating a communication terminal indexing method for a distributed communication terminal set.

FIG. 23 is a view illustrating an antenna indexing method for a distributed communication terminal set.

FIG. 24 is a view illustrating a method for obtaining channel state information.

FIG. 25 is a diagram illustrating a detailed configuration of a communication terminal according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a communication terminal for performing distributed communication in a communication system according to an exemplary embodiment of the present invention and a method thereof will be described with reference to FIGS. 1 to 25. Parts which are required to understand an operation and an effect of the present invention will be mainly described in detail. Throughout the specification, like reference numerals of the drawings denote like components. Further, in the description of the exemplary embodiment, if it is considered that specific description of related known configuration or function may cloud the gist of the present invention, the detailed description thereof will be omitted.

Specifically, the present invention suggests a new way in which at least one communication terminal forms a backhaul link with each of at least one cooperative communication terminal and communicates with at least one target communication device such as a base station or a repeater under cooperation with the at least one cooperative communication terminal which forms the backhaul link.

FIG. 1 is a diagram illustrating a system which provides distributed communication according to an exemplary embodiment of the present invention.

As illustrated in FIG. 1, a system which provides distributed communication according to an exemplary embodiment of the present invention includes at least one target communication device 100, a leading communication terminal 200, and at least one cooperative communication terminal 300.

In this case, the leading communication terminal 200 indicates a terminal which communicates with at least one target communication device 100 and the at least one cooperative communication terminal 300 indicates a terminal which performs distributed communication between the leading communication terminal 200 and the at least one target communication device 100.

When the leading communication terminal 200 receives signals from L target communication devices, the leading communication terminal 200 directly receives only a part of reception signals to be received from the L target communication devices and M cooperative reception communication terminals receive another part of the signals among the reception signals which need to be received by the leading communication terminal from the L target communication devices and provide the received signals to the leading communication terminal or provide a signal, which is obtained by processing another part of the reception signals by a predetermined method, to the leading communication terminal.

The leading communication terminal 200 establishes a backhaul link together with the M cooperative reception communication terminals and collects another part of the reception signals or signals obtained by processing another part of the reception signals by a predetermined method, through the backhaul link from the M cooperative reception communication terminal.

In this case, the leading communication terminal collects another part of the reception signals or signals obtained by processing another part of the reception signals by a predetermined method from the M cooperative reception communication terminals and combines the reception signals which are directly received from the L target communication devices and another part of the signals or the signals obtained by processing another part of the reception signals by a predetermined method, which are collected from the M cooperative reception communication terminal.

In contrast, when the leading communication terminal 200 transmits signals to the L target communication devices, the leading communication terminal 200 may create direct transmission signals to be directly transmitted to the L target communication devices, other transmission signals to be transmitted through N distributed transmission communication terminals or signals which are required for the N cooperative communication terminals to create different transmission signals.

In this case, the leading communication terminal 200 directly transmits the transmission signals to the L target communication devices and establishes a backhaul link with each of the N distributed transmission communication terminals and provides another part of the transmission signals to be transmitted to the L target communication devices through the N distributed transmission communication terminals or signals which are required to create another part of the transmission signals to be transmitted to the L target communication devices by the N cooperative communication terminals, through the backhaul link to the N distributed transmission communication terminals.

Accordingly, the leading communication terminal 200 transmits a part of transmission signals to be directly transmitted to the L target communication devices and the N distributed transmission communication terminals transmit another part of the provided transmission signals to the L target communication devices or transmit signals obtained by creating another part of the transmission signals by a predetermined method, to the L target communication devices.

In this case, the leading communication terminal 200 establishes a backhaul link with each of the N distributed transmission communication terminals and provides another part of the transmission signals to be transmitted to the N distributed transmission communication terminals or signals which are required to create another part of the transmission signals through the backhaul link.

Here, the leading communication terminal 200 and the M cooperative communication terminals may be configured as a distributed communication terminal set for distributed reception and the leading communication terminal 200 and the N cooperative communication terminals may be configured as a distributed communication terminal set for distributed transmission.

In this case, some or all of the M cooperative reception communication terminals may serve as cooperative transmission communication terminals, and some or all of the N cooperative transmission communication terminals may serve as cooperative reception communication terminals. Each of the communication terminal 200, the M cooperative reception communication terminals, and the N cooperative transmission communication terminals may include at least one antenna. Further, the target communication devices 100 may be concepts including a base station, a relay, a repeater, a femtocell base station, a relay transmission femtocell base station, a terminal, and a relay transmission terminal and each of them may include at least one antenna.

Further, the cooperative communication terminal which assists communication between the leading communication terminal 200 and at least one target communication device is divided into a cooperative reception communication terminal and a cooperative transmission communication terminal and the cooperative reception communication terminal and the cooperative transmission communication terminal may be the same terminal or different terminals.

Further, at least one of the cooperative communication terminals of the distributed communication terminal set may serve as a leading communication terminal of another distributed communication terminal set or a cooperative communication terminal of another distributed communication terminal set. In addition, the leading communication terminal may serve as a leading communication terminal of another distributed communication terminal set or a cooperative communication terminal of another distributed communication terminal set.

The leading communication terminal 200 requires, for example, a signal receiving function, a signal collecting function, a signal combining function, a transmission signal creating function for every communication terminal, a signal transmitting function, a signal distributing function, and a backhaul link establishing function in order to communicate with at least one target communication device with assistance of at least one cooperative communication terminal. Each function will be described in detail as follows.

1) Signal receiving function: The leading communication terminal 200 may directly receive at least one reception signal among reception signals to be received from at least one target communication device.

2) Signal collecting function: The leading communication terminal 200 may collect at least one reception signal which is received by at least one cooperative communication terminal from at least one target communication device or at least one signal which is obtained by processing at least one reception signal by a predetermined method, from at least one cooperative communication terminal. In this case, the leading communication terminal 200 may request a reception signal to at least one cooperative communication terminal and receive the reception signal.

3) Signal combining function: The leading communication terminal 200 may combine at least one reception signal which is directly received from the at least one target communication device with another part of the at least one reception signal which is collected from the at least one cooperative communication terminal or at least one signal which is obtained by the at least one cooperative communication terminal by processing another part of the at least one reception signal by a predetermined method.

When the leading communication terminal 200 collects the signals which are obtained by processing another part of the at least one reception signal, which is received by the at least one cooperative communication terminal, by a predetermined method, the leading communication terminal 200 may combine the signals after processing at least one reception signal by the same scheme as a preset scheme which processes another part of the at least one reception signal received by the at least one cooperative communication terminal.

In this case, the leading communication terminal 200 may combine signals using any one of a diversity combining method, a multiplex-combining method, a cooperative combining method, and a hybrid combining method.

4) Transmission signal creating function for every communication terminal: The leading communication terminal 200 may create a transmission signal to be directly transmitted to at least one target communication device and other transmission signal to be transmitted to at least one target communication device by at least one cooperative communication terminal which configures a distributed communication terminal set or a signal which is required to create other transmission signal which is processed by the at least one cooperative communication terminal by a predetermined method to be transmitted.

In this case, the leading communication terminal 200 may create signals to be distributively transmitted using any one of a diversity transmitting method, a multiplex transmitting method, and a hybrid transmitting method.

Further, the signal which is required to create other second transmission signal to be transmitted by the at least one cooperative communication terminal may include a transmitting method, a transmission resource, a modulating method, an encoding method, a transmission time, a carrier frequency, a transmission sequence, an information processing method, transmission data, a modulated signal, and an encoded signal.

5) Signal transmitting function: The leading communication terminal 200 may transmit some or all of signals to be transmitted to at least one target communication device.

6) Signal distributing function: The leading communication terminal 200 may provide a part of signals to be transmitted to at least one target communication device to at least one cooperative communication terminal or provide a signal required to create a part of signals to be transmitted to at least one cooperative communication terminal.

7) Backhaul link establishing function: The leading communication terminal may establish a backhaul link with each of at least one cooperative communication terminal which configures the distributed communication terminal set. Here, the backhaul link may refer to a communication link through which the leading communication terminal transmits and receives a transmission signal, transmission data, a reception signal, reception data, control information, and channel state information to and from at least one distributed communication terminal.

The cooperative communication terminal 300 requires a signal receiving function, a reception signal processing function, a reception signal providing function, a signal transmitting function, a transmission signal creating function, a transmission signal collecting function, and a backhaul link establishing function in order to assist communication between the leading communication terminal 200 and the at least one target communication device 100. Among the above functions, the signal receiving function, the signal transmitting function, and the backhaul link establishing function are the same as those of the leading communication terminal 200 so that the description thereof will be omitted and other functions will be described in detail as follows:

1) Reception signal processing function: The cooperative communication terminal receives a part of reception signals among reception signals to be received by the leading communication terminal from the at least one target communication device and creates a signal to be provided to the leading communication terminal by processing the part of reception signals by a predetermined method.

The method which processes a part of reception signals by the cooperative communication terminal may include a receiving scheme, a demodulating scheme, a decoding scheme, and a hybrid automatic repeat request (HARQ) scheme.

2) Reception signal providing function: The cooperative communication terminal may provide the part of reception signals which are received from at least one target communication device and a signal which is obtained by processing the part of reception signals, to the leading communication terminal through the backhaul link.

3) Transmission signal creating function: The cooperative communication terminal may receive a signal required to create a part of transmission signals from the leading communication terminal and create the part of transmission signals to be transmitted to at least one target communication device by the leading communication terminal using the signal and in accordance with another predetermined method.

4) Transmission signal collecting function: The cooperative communication terminal may receive or request a part of transmission signals to be transmitted to at least one target communication device or a signal required creating the part of transmission signals, from the leading communication terminal.

The leading communication terminal according to the exemplary embodiment of the present invention may configure at least one cooperative communication terminal and the leading communication terminal itself as a distributed communication terminal set for the purpose of distributed communication with at least one target communication device. Next, various embodiments of configuring the distributed communication terminal set will be described. Here, it is limited that the distributed communication terminal set including the leading communication terminal and two or less cooperative communication terminals is configured for the convenience of description, but a distributed communication terminal set including the leading communication terminal and three or more cooperative communication terminals may be configured. It is further limited that the leading communication terminal communicates with two or less target communication devices but the leading communication terminal may communicate with three or more target communication devices in the same manner.

FIG. 2 is a first view illustrating a method for configuring a distributed communication terminal set.

As illustrated in FIG. 2, a first communication terminal among three communication terminals around the leading communication terminal is determined as a cooperative communication terminal and the leading communication terminal and the first communication terminal is configured as the distributed communication terminal set to communicate with the target communication device.

FIG. 3 is a second view illustrating a method for configuring a distributed communication terminal set.

As illustrated in FIG. 3, a first communication terminal and a second communication terminal among three communication terminals around the leading communication terminal are determined as cooperative communication terminals and the leading communication terminal, the first communication terminal, and the second communication terminal are configured as the distributed communication terminal set to communicate with two target communication devices.

FIG. 4 is a third view illustrating a method for configuring a distributed communication terminal set.

As illustrated in FIG. 4, among three communication terminals around the leading communication terminal, the first communication terminal and the second communication terminal are determined as cooperative communication terminals for transmission and the second communication terminal and a third communication terminal are determined as cooperative communication terminal for reception so that the leading communication terminal, the first communication terminal, and the second communication terminal are configured as a distributed communication terminal set for transmission to transmit a signal to the target communication device and the leading communication terminal, the second communication terminal, and the third communication terminal are configured as a distributed communication terminal set for reception to receive a signal from the target communication device.

In this case, at least one cooperative communication terminal which belongs to the distributed communication terminal set for transmission and at least one cooperative communication terminal which belongs to the distributed communication terminal set for reception may be the same like the second communication terminal and at least one cooperative communication terminal which belongs to the distributed communication terminal set for transmission and at least one cooperative communication terminal which belongs to the distributed communication terminal set for reception may be different from each other like the first communication terminal and the third communication terminal.

FIG. 5 is a fourth view illustrating a method for configuring a distributed communication terminal set.

As illustrated in FIG. 5, among three communication terminals around the leading communication terminal, the first communication terminal and the second communication terminal are determined as cooperative communication terminals for communication with the first target communication device and the second communication terminal and a third communication terminal are determined as cooperative communication terminals for communication with the second target communication device so that the leading communication terminal, the first communication terminal, and the second communication terminal are configured as a first distributed communication terminal set to communicate with the first target communication device and the leading communication terminal, the second communication terminal, and the third communication terminal configure a second distributed communication terminal set to communicate with the second target communication device.

In this case, at least one cooperative communication terminal which belongs to the distributed communication terminal set for communication with at least one target communication device and at least one cooperative communication terminal which belongs to the distributed communication terminal set for communication with at least one another target communication device may be the same like the second communication terminal and at least one cooperative communication terminal which belongs to the distributed communication terminal set for communication with at least one target communication device and at least one cooperative communication terminal which belongs to the distributed communication terminal set for communication with other at least one target communication device may be different from each other like the first communication terminal and the third communication terminal.

FIG. 6 is a fifth view illustrating a method for configuring a distributed communication terminal set.

As illustrated in FIG. 6, a first communication terminal configured by the same RAT as the leading communication terminal configured by a first RAT is determined as cooperative communication terminals and the leading communication and the first communication terminal are configured as a distributed communication terminal set to communicate with a target communication device configured by the first RAT.

FIG. 7 is a sixth view illustrating a method for configuring a distributed communication terminal set.

As illustrated in FIG. 7, a first communication terminal and a second communication terminal configured by a second RAT which is different from the RAT of the leading communication terminal which is configured by a first RAT are determined as cooperative communication terminals and the leading communication, the first communication terminal, and the second communication terminal are configured as a distributed communication terminal set to communicate with a first target communication device configured by the first RAT and a second target communication device configured by the second RAT.

In this case, the leading communication terminal configured by the first RAT communicates with the first communication device configured by the first RAT and the first communication terminal and the second communication terminal which are configured by the second RAT communicate with the second target communication device configured by the second RAT.

The leading communication terminal according to the exemplary embodiment of the present invention may establish the backhaul link with each of at least one cooperative communication which configures the distributed communication terminal set in order to communicate with at least one target communication device. The process of establishing a backhaul link will be described with reference to FIG. 8.

FIG. 8 is a diagram illustrating a method for establishing a backhaul link according to an exemplary embodiment of the present invention.

As illustrated in FIG. 8, a method for establishing a backhaul link by the leading communication terminal may include a step of searching a cooperative communication terminal, a step of determining the cooperative communication terminal, and a step of setting connection with the cooperative communication terminal.

The leading communication terminal searches surroundings using a RAT modem for configuring one backhaul configuration which is included therein to search at least one communication terminal for configuring a distributed communication terminal set in step S810.

Next, the leading communication terminal may determine at least one cooperative communication terminal for performing distributed communication with at least one target communication device among searched communication terminals in step S820.

In this case, the leading communication terminal selects at least one candidate communication terminal, transmits the selected at least one candidate communication terminal to the at least one target communication device and the at least one target communication device determines at least one cooperative communication terminal among at least one candidate communication terminal.

This will be specifically described below. The leading communication terminal selects at least one candidate communication terminal using a distributed communication terminal set determination considering factor.

The leading communication terminal transmits the selected at least one candidate communication terminal to the at least one target communication device.

The at least one target communication device which receives the selected at least one candidate communication terminal determines at least one cooperative communication terminal among at least one candidate communication terminal in consideration of the distributed communication terminal set determination considering factor, a security level, and whether to certify.

Here, the security level indicates a security level of the candidate communication terminal. That is, the target communication device may determine a candidate communication terminal having a predetermined security level or higher as a cooperative communication terminal.

Whether to certify indicate whether the candidate communication terminal is a device which is certified by a business party which provides the target communication device. That is, the target communication device may determine the certified candidate communication terminal as a cooperative communication terminal.

Further, the leading communication terminal tentatively determines at least one cooperative communication terminal and transmits the determined at least one cooperative communication terminal to the at least one target communication device and the at least one target communication device approves the received at least one cooperative communication terminal.

This will be specifically described below. The leading communication terminal determines at least one cooperative communication terminal using the distributed communication terminal set determination considering factor.

The leading communication terminal transmits the determined at least one cooperative communication terminal to the at least one target communication device.

The at least one target communication device which receives the determined at least one cooperative communication terminal approves the at least one cooperative communication terminal which is tentatively determined by the leading communication terminal in consideration of the distributed communication terminal set determination considering factor, the security level, and whether to certify.

Next, the leading communication terminal may perform connection setting for backhaul link with each of the determined at least one cooperative communication terminal in step S830. For this connection setting, the leading communication terminal may perform procedure such as connection setting request, security information providing, connection agreement.

The leading communication terminal according to an exemplary embodiment of the present invention determines at least one candidate communication terminal for at least one cooperative communication terminal which configures a distributed communication terminal set in order to perform distributed communication with at least one target communication device or at least one cooperative communication terminal. In this case, the leading communication terminal may determine at least one candidate communication terminal or at least one cooperative communication terminal in consideration of a backhaul link characteristic, an access link characteristic, and an RAT configuration of a communication terminal. The consideration factors will be described in detail.

1) The backhaul link characteristic may include a delay time, an available transmission rate, and a packet loss rate in accordance with a characteristic of an RAT which is used by the leading communication terminal to be connected to the candidate communication terminal or the cooperative communication terminal. In addition, it is obvious that various factors related with the characteristic of the RAT for connection of the backhaul link may be included in the backhaul link characteristic.

The delay time includes an absolute delay time and a relative delay time. The absolute delay time is a time when it takes for the communication terminal which receives a packet to receive one packet since a communication terminal which transmits a packet transmits the packet and the relative delay time is a time when it takes for the communication terminal which receives a packet to receive a next packet after receiving one packet.

The available transmission rate indicates data amount which is capable of being transmitted between the leading communication terminal and the candidate communication terminal or the cooperative communication terminal.
The packet loss rate indicates a loss probability generated when the packet is transmitted between the leading communication terminal and the candidate communication terminal or the cooperative communication terminal.

As an example, when the leading communication terminal which searches three communication terminals from the surroundings determines a candidate communication terminal using an available transmission rate, the leading communication terminal obtains 1 Mbps as an available transmission rate of the first communication terminal, 3 Mbps as an available transmission rate of the second communication terminal, and 5 Mbps as an available transmission rate of the third communication terminal through a process of searching a cooperative communication terminal and selects the third communication terminal having the highest available transmission as a candidate communication terminal for the distributed communication terminal set for reception and the second communication terminal having the second highest available transmission rate as a candidate communication terminal for the distributed communication terminal set for transmission, based on the obtained information.

As another example, when the leading communication terminal which searches three communication terminals from the surroundings determines a primary candidate communication terminal using the relative delay time, the leading communication terminal obtains 50 ms as a relative delay time of the first communication terminal, 100 ms as a relative delay time of the second communication terminal, and 200 ms as a relative delay time of the third communication terminal through a process of searching a cooperative communication terminal and determines the first communication terminal having the shortest relative delay time as a candidate communication terminal which belongs to the distributed communication terminal set for reception and transmission, based on the obtained information.

2) The access link characteristic may include a received signal strength indicator (RSSI), a signal to noise ratio (SNR), a signal to interference plus noise ratio (SINR), a channel state indicator (CSI), a multiple input multiple output (MIMO) configuration, a channel quality indicator (CQI), a rank indicator (RI), and a precoding matrix indicator (PMI) determined in accordance with channel attenuation, shadowing, fading, delay spread, multiple path, in-cell interference, adjacent cell interference, Doppler, an antenna gain, channel allocation which are characteristics of a channel formed between the candidate communication terminal or the cooperative communication terminal and the target communication device. In addition, it is obvious that various factors related with the channel characteristic between the candidate communication terminal or the cooperative communication terminal and the target communication device are used as the access link characteristic.

The RSSI is an indicator indicating a received signal strength which is measured by the candidate communication terminal or the cooperative communication terminal.

The SNR is a signal to noise ratio and is an indicator indicating a ratio of a signal power with respect to a noise power.

The SINR is a signal to interference plus noise ratio and is an indicator indicating a ratio of a signal power with respect to interference and noise power.

The CSI indicates a channel state between the candidate communication terminal or the cooperative communication terminal and the target communication device.

The MIMO configuration indicates an antenna configuration between the candidate communication terminal or the cooperative communication terminal and the target communication device. For example, 4×2 MINO configurations are configured between a target communication device including four antennas and a candidate communication terminal including two antennas.

The CQI is an indicator indicating a channel quality between the candidate communication terminal or the cooperative communication terminal and the target communication device.

The RI is an indicator indicating a number of data streams which are independently available for a matrix channel formed between the candidate communication terminal or the cooperative communication terminal and the target communication device.

The PMI indicates a precoding matrix for signal transmission between the candidate communication terminal or the cooperative communication terminal and the target communication device.

As an example, when the leading communication terminal which searches three communication terminals at surroundings determines a primary cooperative communication terminal using the SNR, the leading communication terminal obtains 5 dB as an SNR of the first communication terminal, 10 dB as an SNR of the second communication terminal, and 20 dB as an SNR of the third communication terminal through the process of searching a cooperative communication terminal and determines the third communication terminal having the highest SNR as a cooperative communication terminal which belongs to the distributive communication terminal set for reception based on the obtained information.

3) The RAT configuration indicates information on a RAT modem which is included in the candidate communication terminal or the cooperative communication terminal. The candidate communication terminal or the cooperative communication terminal may include at least one RAT among various RATs such as global system for mobile communications (GSM), wideband code division multiple access (WCDMA), long-term evolution (LTE), WiBro, WiFi, near field communication (NFC), Bluetooth, ultra wideband (UWB), or infrared communication. Further, the RAT configuration may include individual operation states of RAT modems which are included in the candidate communication terminal or the cooperative communication terminal. Here, the operation status of the RAT modems may include an on-state, an off-state, a sleep mode, and a wake-up control mode.

As an example, when the leading communication terminal which searches three communication terminals at surroundings determines a primary cooperative communication terminal using the RAT configuration, the leading communication terminal obtains that a RAT of the first communication terminal is configured by LTE, NFC, and Bluetooth, a RAT of the second communication terminal is configured by WCDMA, LTE, and WiFi, and a RAT of the third communication terminal is configured by WCDMA and WiBro through the process of searching a cooperative communication terminal and selects the first communication terminal and the second communication terminal which include the LTE as a candidate communication terminal for the distributed communication terminal set for transmission based on the obtained information.

The leading communication terminal according to an exemplary embodiment of the present invention may form the backhaul link with each of at least one cooperative communication terminal which configures the distributed communication terminal set in order to provide a signal to at least one cooperative communication terminal which configures the distributed communication terminal set or collect signals from at least one cooperative communication terminal.

In this case, the backhaul link may include a wired backhaul link and a wireless backhaul link and the wireless backhaul link may include an in-band backhaul link and an out-band backhaul link.

FIG. 9 is a view illustrating a method for forming a wired backhaul link.

As illustrated in FIG. 9, the leading communication terminal may form a wired backhaul link with each of at least one cooperative communication terminal which configures the distributed communication terminal set. For example, the leading communication terminal forms the wired backhaul link with the first communication terminal and the second communication terminal and provides signals to the first communication terminal and the second communication terminal or collects signals from the first communication terminal and the second communication terminal using the wired backhaul link.

The leading communication terminal may form a wireless backhaul link with each of at least one cooperative communication terminal which configures the distributed communication terminal set. In this case, the RAT which is used by the leading communication terminal to form the wireless backhaul link with each of at least one cooperative communication terminal may include not only a cellular modem such as GSM, WCDMA, and LTE but also a wireless communication RAT such as WiBro, WiFI, NFC, Bluetooth, UWB, or infrared communication.

FIG. 10 is a first view illustrating a method for forming a wireless backhaul link.

As illustrated in FIG. 10, a leading communication terminal forms an in-band backhaul link with each of at least one cooperative communication terminal which configures a distributed communication terminal set using the same frequency band as a frequency band which is used for communication between the distributed communication terminal set and the at least one target communication device.

As an example, the leading communication terminal may form the wireless backhaul link with the first communication terminal and the second communication terminal using the same frequency band as a first frequency band which is used for communication with the target communication device. The leading communication terminal may provide signals to the first communication terminal and the second communication or collect signals from the first communication terminal and the second communication terminal using the wireless backhaul link of the first frequency band.

FIG. 11 is a second view illustrating a method for forming a wireless backhaul link.

As illustrated in FIG. 11, a leading communication terminal forms an out-band backhaul link with each of at least one cooperative communication terminal which configures a distributed communication terminal set using a frequency band different from a frequency band which is used for communication between the distributed communication terminal set and the at least one target communication device.

As an example, the leading communication terminal may form the wireless backhaul link with the first communication terminal and the second communication terminal using the same frequency band as a first frequency band which is used for communication with the target communication device. The leading communication terminal may provide signals to the first communication terminal and the second communication or collect signals from the first communication terminal and the second communication terminal using the wireless backhaul link of the first frequency band.

Further, the leading communication terminal may form a wireless backhaul link with the first communication terminal using the second frequency band and form a wireless backhaul link with the second communication terminal using a third frequency band to form an out-band haul link.

The leading communication terminal and at least one cooperative communication terminal which configure the distributed communication terminal set may receive a part of signals among signals to be received by the leading communication terminal from the at least one target communication device.

FIG. 12 is a first view illustrating a method for receiving a signal in a distributed communication terminal set.

As an example, when a distributed communication terminal set is configured by a leading communication terminal and two cooperative communication terminals, the leading communication terminal receives a signal $y_1$ from the target communication device, the first cooperative communication terminal receives a signal $y_2$, and the second cooperative communication terminal receives a signal $y_3$.

In this case, at least two of the signal $y_1$ which is received by the leading communication terminal from the target communication device and the signals $y_2$ and $y_3$ which are received by the cooperative communication terminals from the target communication device, that is, at least two of signals $y_1$, $y_2$, and $y_3$ may be any one of the same information, different information, and mixed information.

As another example, when the distributed communication terminal set is configured by the leading communication terminal and two cooperative communication terminals, the leading communication terminal uses a resource f1 to receive the signal $y_1$ from the target communication device, the first cooperative communication terminal uses a resource f2 to receive the signal $y_2$, and the second cooperative communication terminal uses a resource f3 to receive the signal $y_3$.

In this case, at least two of the resource f1 which is used by the leading communication terminal to directly receive the signal from the target communication device and the resources f2 and f3 which are used by the cooperative communication terminals to receive the signals from the target communication device, that is, at least two of the resources f1, f2, and f3 may be the same resource or different resources.

Further, the leading communication terminal may collect the signal which is received by the at least one cooperative communication terminal from the at least one target communication device or a signal which is obtained by processing the signal received by the at least one cooperative communication terminal by a predetermined method, from the at least one cooperative communication terminal.

As an example, when the distributed communication terminal set is configured by the leading communication terminal and two cooperative communication terminals, the leading communication terminal may collect a signal $y'_2$ from the first cooperative communication terminal and a signal $y'_3$ from the second cooperative communication terminal.

As another example, when the distributed communication terminal set is configured by the leading communication terminal and two cooperative communication terminals, the leading communication terminal may collect the signal $y_2$ received by the first cooperative communication terminal from the target communication device or a signal $y'_2$ which is obtained by processing the signal $y_2$ which is received by the first cooperative communication terminal by a predetermined method from the first cooperative communication terminal. Further, the leading communication terminal may collect the signal $y_3$ received by the second cooperative communication terminal from the target communication device or a signal $y'_3$ which is obtained by processing the signal $y_3$ which is received by the second cooperative communication terminal by a predetermined method from the second cooperative communication terminal.

In this case, the leading communication terminal make a request to the cooperative communication terminals which belong to the distributed communication terminal set and the cooperative communication terminal which receives the request of the leading communication terminal provides the signals received from the target communication device to the leading communication terminal so that the leading communication terminal may collect the signals from the cooperative communication terminals which belong to the distributed communication terminal set. Alternately, the cooperative communication terminals which belong to the distributed communication terminal set provides periodically or non-periodically provide signals to the leading communication terminal so that the leading communication terminal may collect the signals from the cooperative communication terminals which belong to the distributed communication terminal set. The leading communication terminal may create matrixes using the signal which is directly received from the target communication device and the signals collected from the two cooperative communication terminals and combine the created matrixes in accordance with a receiving scheme. In this case, the receiving scheme includes a diversity combining method, a multiplex combining method, a cooperative combining method, and a hybrid combining method.

As another example, when the distributed communication terminal set is configured by the leading communication terminal and two cooperative communication terminals, the first cooperative communication terminal receives the signal $y_2$ from the target communication device and demodulates and decodes the received signal $y_2$ to create a signal $y'_2$ and the second cooperative communication terminal receives the signal $y_3$ from the target communication device and demodulates and decodes the received signal $y_3$ to create a signal $y'_3$. The leading communication terminal collects the signal $y'_2$ from the first cooperative communication terminal and the signal $y'_3$ from the second cooperative communication terminal and multiplexes a signal which is obtained by processing the signal $y_1$ which is directly received by itself by the same scheme as a scheme, which processes the signals $y_2$ and $y_3$ which are received by the first and second cooperative communication terminals, respectively to create signals $y'_2$ and $y'_3$, with the signal $y'_2$ and the signal $y'_3$. The leading communication terminal may create matrixes using the signal which is directly received from the target communication device and the signals collected from the two cooperative communication terminals and combine the created matrices in accordance with a receiving scheme. In this case, the preset processing scheme for the cooperative communication terminal includes a receiving scheme, a demodulating scheme, a decoding scheme, and a HARQ scheme and the receiving scheme of the leading communication terminal includes a diversity combining method, a multiplex combining method, a cooperative combining method, and a hybrid combining method.

The leading communication terminal and at least one cooperative communication terminal which configure the distributed communication terminal set may receive a part of signals among signals to be received by the leading communication terminal from the at least one target communication terminal. FIG. 13 is a second view illustrating a method for receiving a signal in a distributed communication terminal set.

As illustrated in FIG. 13, when the distributed communication terminal set is configured by the leading communication terminal and one cooperative communication terminal, the leading communication terminal and the cooperative communication terminal receive a signal vector $y_1$ from a first target communication device and a signal vector $y_2$ from a second target communication device. In this case, the signal vector $y_1$ which is received from the first target communication device and the signal vector $y_2$ which is received from the second target communication device by the leading communication terminal and the cooperative communication terminal, that is, the signal vectors $y_1$ and $y_2$ may be one of the same information, different information, and mixed information. Here, the mixed information may indicate information in which a part of the same information and a part of the different information are mixed.

As another example, when the distributed communication terminal set is configured by the leading communication terminal and one cooperative communication terminal, the distributed communication terminal set uses a resource f1 to receive the signal vector $y_1$ from the first target communication device and uses a resource f2 to receive the signal vector $y_2$ from the second target communication device. In this case, the resource f1 which is used by the distributed communication terminal set to receive the signal vector $y_1$ from the first target communication device and the resource f2 which is used by the distributed communication terminal set to receive the signal vector $y_2$ from the second target communication device may be the same resource or different resources.

Further, the first distributed communication terminal set which is configured by the leading communication terminal and at least one cooperative communication terminal receives a part of signals to be received by the leading communication terminal from the at least one target communication device and the second distributed communication terminal set which is configured by the leading communication terminal and another part of the at least one cooperative communication terminal receives a part of signals to be received by the leading communication terminal from another part of the at least one target communication device.

FIG. 14 is a third view illustrating a method for receiving a signal in a distributed communication terminal set.

As illustrated in FIG. 14, when a leading communication terminal and a first cooperative communication terminal configure a first distributed communication terminal set and the leading communication terminal and a second cooperative communication terminal configure a second distributed communication terminal set, the leading communication terminal and the first cooperative communication terminal receive a signal vector $y_1$ from the first target communication device and the leading communication terminal and the second cooperative communication terminal receive a signal vector $y_2$ from the second target communication device. In this case, the signal vector $y_1$ which is received from the first target communication device by the leading communication terminal and the first cooperative communication terminal and the signal vector $y_2$ which is received from the second target communication device by the leading communication terminal and the second cooperative communication terminal, that is, the signal vectors $y_1$ and $y_2$ may be one of the same information, different information, and mixed information.

As another example, when the leading communication terminal and the first cooperative communication terminal configure a first distributed communication terminal set and the leading communication terminal and the second cooperative communication terminal configure a second distributed communication terminal set, the first distributed communication terminal set uses a resource f1 to receive the signal vector $y_1$ from the first target communication device and the second distributed communication terminal set uses a resource f2 to receive the signal vector $y_2$ from the second target communication device. In this case, the resource f1 which is used by the first distributed communication terminal set to receive the signal vector $y_1$ from the first target communication device and the resource f2 which is used by the second distributed communication terminal set to receive the signal vector $y_2$ from the second target communication device may be the same resource or different resources.

The leading communication terminal may create a transmission signal to be directly transmitted to at least one target communication signal and another transmission signal to be transmitted to at least one target communication device by at least one cooperative communication terminal or a signal which is required to be processed by the at least one cooperative communication terminal by a predetermined method to create another transmission signal.

FIG. 15 is a first view illustrating a method for transmitting a signal in a distributed communication terminal set.

As illustrated in FIG. 15, when a distributed communication terminal set is configured by a leading communication terminal and two cooperative communication terminals, the leading communication terminal creates a signal $x_1$ to be directly transmitted to a target communication device and creates a signal $x_2$ which is transmitted to the target communication device through the first cooperative communication terminal or a signal $x'_2$ which is required to be processed by the first cooperative communication terminal by a predetermined method to create a signal $x_2$ to be transmitted, and creates a signal $x_3$ which is transmitted to the target communication device through the second cooperative communication terminal or a signal $x'_3$ which is required to be processed by the second cooperative communication terminal by a predetermined method to create a signal $x_3$ to be transmitted. In this case, at least two of the signal $x_1$ to be directly transmitted by the leading communication terminal to the target communication device and the signals $x_2$ and $x_3$ to be transmitted by the cooperative communication terminals to the target communication device may be any one of same information, different information, mixed information, same signal, and different signals.

Further, the leading communication terminal may provide at least one transmission signal to be transmitted through at least one cooperative communication terminal, among transmission signals to be transmitted to at least one target communication device, to at least one cooperative communication terminal or provide a signal which is required for the at least one cooperative communication terminal to create a signal to be transmitted, to the at least one cooperative communication terminal. As an example, when the distributed communication terminal set is configured by the leading communication terminal and two cooperative communication terminals, the leading communication terminal may provide a signal $x'_2$ to the first cooperative communication terminal and a signal $x'_3$ to the second cooperative communication terminal. In this case, at least two of the signal $x_1$ to be directly transmitted by the leading communication terminal to the target communication device and the signals $x'_2$ and $x'_3$ to be transmitted by the cooperative communication terminals to the target communication device, that is, at least two of the signals $x'_2$ and $x'_3$ may be one of same information, different information, mixed information, same signal, and different signals.

Further, the leading communication terminal and at least one cooperative communication terminal which configure the distributed communication terminal set may distributively transmit signals to be transmitted by the leading communication terminal to the at least one target communication terminal. In this case, the leading communication terminal transmits a direct transmission signal to be directly transmitted to the at least one target communication device and each of at least one cooperative communication terminal transmits a respective distributed transmission signal which is provided from the leading communication terminal to at least one target communication device or distributed transmission signals which are created by a predetermined method using a signal provided from the leading communication terminal, to the at least one target communication device.

As an example, when the distributed communication terminal set is configured by the leading communication terminal and two cooperative communication terminals, the leading communication terminal transmits the signal $x_1$ to the target communication device, the first cooperative communication terminal transmits the signal $x_2$, and the second cooperative communication terminal transmits the signal $x_3$. In this case, at least two of the signal $x_1$ which is directly transmitted by the leading communication terminal to the target communication device and the signals $x_2$ and $x_3$ which are transmitted by the cooperative communication terminals to the target communication device may be any one of same information, different information, mixed information, and different signals.

As another example, when the distributed communication terminal set is configured by the leading communication terminal and two cooperative communication terminals, the leading communication terminal uses a resource f1 to transmit the signal $x_1$ to the target communication device, the first cooperative communication terminal uses a resource f2 to transmit the signal $x_2$, and the second cooperative communication terminal uses a resource f3 to transmit the signal $x_3$. In this case, at least two of the resource f1 which is used by the leading communication terminal to directly transmit the signal to the target communication device and the resources f2 and f3 which are used by the cooperative communication terminals to transmit the signals to the target communication device, that is, at least two of the resources f1, f2, and f3 may be the same resource or different resources.

As another example, when the distributed communication terminal set is configured by the leading communication terminal and two cooperative communication terminals, the first cooperative communication terminal transmits a distributed transmission signal $x_2$, which is obtained by processing a signal $x'_2$, which is received from the leading communication terminal by a predetermined method, to the target communication device and the second cooperative communication terminal transmits a distributed transmission signal $x_3$, which is obtained by processing a signal $x'_3$, which is received from the leading communication terminal, by a predetermined method, to the target communication device. In this case, the cooperative communication terminals may create a distributed transmission signal in accordance with the predetermined method using a signal which is provided from the leading communication terminal and transmit the distributed transmission signal to the target communication device ($x'_2 \neq x_2$, $x'_3 \neq x_3$) or transmit the signal which is provided from the leading communication terminal to the target communication device without processing the signal ($x'_2 = x_2$, $x'_3 = x_3$).

Further, the leading communication terminal and the cooperative communication terminals which configure the distributed communication terminal set may transmit a part of transmission signals to be distributively transmitted by the leading communication terminal to the at least two target communication devices.

FIG. 16 is a second view illustrating a method for transmitting a signal in a distributed communication terminal set.

As illustrated in FIG. 16, when a distributed communication terminal set is configured by a leading communication terminal and one cooperative communication terminal, the leading communication terminal and the cooperative communication terminal transmit a signal vector $x_1$ to a first target communication device and a signal vector $x_2$ to a second target communication device. In this case, the signal vector $x_1$ which is transmitted to the first target communication device by the leading communication terminal and the cooperative communication terminal and the signal vector $x_2$ which is transmitted to the second target communication device by the leading communication terminal and the cooperative communication terminal, that is, the signals $x_1$ and $x_2$ may be one of the same information, different information, mixed information, the same signal, and different signals.

As another example, when the distributed communication terminal set is configured by the leading communication terminal and one cooperative communication terminal, the distributed communication terminal set uses a resource f1 to transmit the signal vector $x_1$ to the first target communication device and uses a resource f2 to transmit the signal vector $x_2$ to the second target communication device. In this case, the resource f1 which is used by the distributed communication terminal set to transmit the signal vector $x_1$ to the first target communication device and the resource f2 which is used by the distributed communication terminal set to transmit the signal vector $x_2$ to the second target communication device may be the same resource or different resources.

Further, the first distributed communication terminal set which is configured by the leading communication terminal and at least one cooperative communication terminal transmits a part of signals to be transmitted by the leading communication terminal to be distributed to the at least one target communication device and the second distributed communication terminal set which is configured by the leading communication terminal and another part of the at least one cooperative communication terminal distributively transmits another part of the signals to be transmitted by the leading communication terminal to another part of the at least one target communication device.

FIG. 17 is a third view illustrating a method for transmitting a signal in a distributed communication terminal set.

As illustrated in FIG. 17, when a leading communication terminal and a first cooperative communication terminal configure a first distributed communication terminal set and the leading communication terminal and a second cooperative communication terminal configure a second distributed communication terminal set, the leading communication terminal and the first cooperative communication terminal transmit a signal vector $x_1$ to the first target communication device and the leading communication terminal and the second cooperative communication terminal transmit a signal vector $x_2$ to the second target communication device. In this case, the signal vector $x_1$ which is transmitted to the first target communication device by the leading communication terminal and the first cooperative communication terminal and the signal vector $x_2$ which is transmitted to the second target communication device by the leading communication terminal and the second cooperative communication terminal, that is, the signals $x_1$ and $x_2$ may be one of the same information, different information, mixed information, the same signal, and different signals.

That is, the leading communication terminal may transmit one of the same information, the different information, the mixed information, the same signal, and the different signals to at least two of at least two target communication devices. Here, the mixed information is information in which a part of same information and a part of different information are combined.

As another example, when the leading communication terminal and the first cooperative communication terminal configure a first distributed communication terminal set and the leading communication terminal and the second cooperative communication terminal set configure a second distributed communication terminal set, the first distributed communication terminal set may use a resource f1 to transmit the signal vector $x_1$ to the first target communication device and the second distributed communication terminal set uses a resource f2 to transmit the signal vector $x_2$ to the second target communication device. In this case, the resource f1 which is used by the first distributed communication terminal set to transmit the signal vector $x_1$ to the first target communication device and the resource f2 which is used by the second distributed communication terminal set to transmit the signal vector $x_2$ to the second target communication device may be the same resource or different resources.

The leading communication terminal according to the exemplary embodiment of the present invention provides a signal required to create a distributed transmission signal to be transmitted by at least one cooperative terminal, among transmission signals to be transmitted to at least one target communication device, to at least one cooperative communication terminal and at least one cooperative communication terminal may create a distributed transmission signal by a predetermined method using the signal provided from the leading communication terminal to transmit the distributed transmission signal to the at least one target communication device. In this case, the signal which is required to create the distributed transmission signal to be transmitted by the at least one cooperative communication terminal to the at least one target communication device may include a transmitting method, a transmission resource, a modulating method, an encoding method, a transmission time, a carrier frequency, a transmission sequence, an information processing method, transmission data, a modulated signal, and an encoded signal.

The transmitting method is a method which transmits a signal of the leading communication terminal by the at least one cooperative communication terminal to the at least one target communication device and includes a diversity transmitting method, a multiplex transmitting method, and a hybrid transmitting method. Details of the transmitting method will be described in a method for creating a transmission signal.

A transmission resource indicates a resource which is used to transmit a signal of the leading communication terminal which is created by the at least one cooperative communication terminal, to the at least one target communication device. The transmission resource includes a time, a frequency, a code, a space, an antenna, and a power.

The modulating method indicates a modulating method or a modulating level which is used to transmit a signal of the leading communication terminal which is created by the at least one cooperative communication terminal, to the at least one target communication device. The modulating method includes quadrature amplitude modulation (QAM), pulse amplitude modulation (PAM), phase-shift keying (PSK), amplitude shift keying (ASK), and frequency shift keying (FSK) and the modulating level of the QAM includes 4QAM, 16QAM, 64QAM and the modulating level of the PSK includes BPSK, QPSK, 8PSK, and 16PSK.

The encoding method indicates a channel encoding method or an encoding rate which is used to transmit a signal of the leading communication terminal which is created by the at least one cooperative communication terminal, to the at least one target communication device. The channel encoding method includes a low-density parity-check (LDPC) code, a turbo code, a convolutional code, a Reed-Solomon (RS) code and the encoding rate includes ½, ⅓, ⅔, ¼, and ¾.

The transmission time indicates a time when it takes to transmit a signal of the leading communication terminal which is created by the at least one cooperative communication terminal to the at least one target communication device.

The carrier frequency indicates a carrier frequency which is used to transmit a signal of the leading communication terminal which is created by the at least one cooperative communication terminal to the at least one target communication device.

The transmission sequence indicates an order by which a signal of the leading communication terminal which is created by the at least one cooperative communication terminal is transmitted to the at least one target communication device.

The information processing method indicates a method that processes a signal required to create the transmission signal provided from the leading communication terminal by the at least one cooperative communication terminal. The information processing method includes a simple processing method and a combination processing method.

The simple processing method is a method which creates a signal to be transmitted to the at least one target communication device independently using signals required to create the transmission signal which is provided from the leading communication terminal by the at least one cooperative communication terminal.

As an example of the simple processing method, when the first cooperative communication terminal receives $s_1$, $s_2$, and $s_3$ as a signal required to create the transmission signal from the leading communication terminal, signals $s^*_1$, $s^*_2$, and $s^*_3$ are created by independently conjugating the individual signals and the signals $s^*_1$, $s^*_2$, and $s^*_3$ are transmitted to the at least one target communication device.

The combination processing method is a method which creates a signal to be transmitted to the at least one target communication device by combining signals required to create the transmission signal which is provided from the leading communication terminal by the at least one cooperative communication terminal.

As an example of the combination processing method, when the first cooperative communication terminal receives $s_1$, $s_2$, and $s_3$ as information for creating a signal from the leading communication terminal, the signals are combined to create signals $y_1$, $y_2$, $y_3$, and $y_4$ and transmit the signals $y_1$, $y_2$, $y_3$, and $y_4$ to the at least one target communication device.

The transmission data indicates data to be transmitted to the at least one target communication device by the at least one cooperative communication terminal. The transmission data to be provided to the at least one cooperative communication terminal by the leading communication terminal includes all data to be transmitted to the at least one target communication device by the distributed communication terminal set or only data to be transmitted to the at least one target communication device by the cooperative communication terminal.

The modulated signal is a signal which is modulated in the leading communication terminal to be provided to the at least one cooperative communication terminal and is a signal to be transmitted to the at least one target communication device by the at least one cooperative communication terminal.

The encoded signal is a signal which is encoded in the leading communication terminal to be provided to the at least one cooperative communication terminal and is a signal which is modulated by the at least one cooperative communication terminal to be transmitted to the at least one target communication device.

The at least one cooperative communication terminal according to the exemplary embodiment of the present invention receives a part of signals to be received from the at least one target communication device by the leading communication terminal and provides a signal which is obtained by processing the received signal by a predetermined method to the leading communication terminal. In this case, a signal processing method for a part of received signals among signals to be received from the at least one target communication device by the leading communication terminal includes a receiving scheme, a demodulating scheme, a decoding scheme, and a hybrid automatic repeat request (HARQ) scheme.

The receiving scheme is a method which receives a signal of the leading communication terminal by the at least one cooperative communication terminal from the at least one target communication device and includes a diversity combining method, a multiplex combining method, a cooperative combining method, and a hybrid transmitting method. Details of the receiving scheme will be described in a method for combining reception signals.

The demodulating scheme indicates a processing method which demodulates a signal of the leading communication terminal which is received by the at least one cooperative communication terminal. The signal which is received from the at least one target communication device by the at least one cooperative communication terminal is a demodulated signal and the demodulating process is performed in the cooperative communication terminal so that the demodulating process in the leading communication terminal may be omitted. The demodulating scheme includes various demodulating schemes such as QAM demodulation, PAM demodulation, PSK demodulation, ASK demodulation, and FSK demodulation.

The decoding scheme indicates a processing method which decodes a signal of the leading communication terminal which is received by the at least one cooperative communication terminal as a channel. The signal which is received from the at least one target communication device by the at least one cooperative communication terminal is a channel coded signal and the decoding process is performed in the cooperative communication terminal so that the decoding process in the leading communication terminal may be omitted. The channel decoding scheme includes Viterbi decoding, LDPC decoding, turbo decoding, and RS decoding.

The HARQ scheme indicates a processing method which corrects an error of the signal of the leading communication terminal which is received by the at least one cooperative communication terminal and retransmits the signal. When an error occurs in the signal which is received from the at least one target communication device by the at least one cooperative communication terminal, the cooperative communication terminals perform error correction and retransmission so that the HARQ process in the leading communication terminal may be omitted.

The leading communication terminal may create a signal so as to transmit a signal by a transmission diversity method, an Alamouti diversity method, and an STBC method to diversity transmit the signal using at least two antennas which are equipped in communication terminals which configure the distributed communication terminal set. The leading communication terminal may create a signal such that the distributed communication terminal set configured by the leading communication terminal including at least one antenna and the at least one cooperative communication terminal including at least one antenna simultaneously transmits the same signal through at least two antennas to transmit a signal by the transmission diversity method or transmits a signal through spatial coding transmission using two antennas and time coding transmission using additional time by the Alamouti diversity method or the STBC method. In this case, the signal which is transmitted by the leading communication terminal to the cooperative communication terminals is a transmission signal, transmission data, a transmission parameter, and a transmitting method and the transmission parameter includes a modulation parameter and a coding parameter.

FIG. 18 is a view illustrating a signal diversity transmitting method.

As illustrated in FIG. 18, a distributed communication terminal set configured by a leading communication terminal including one antenna and a cooperative communication terminal including one antenna transmits a signal by the signal diversity transmitting method. That is, the signal $x_1$ is transmitted through the antenna of the leading communication terminal the signal $x_2$ is transmitted through the antenna of the cooperative communication terminal at a first time slot. Next, at a second time slot, the signal $-x^*_2$ is transmitted through the antenna of the leading communication terminal and the signal $x^*_1$ is transmitted through the antenna of the cooperative communication terminal so that the signals are transmitted so as to maintain mutual orthogonality between signals and a maximum transmission diversity gain may be obtained through a simple linear decoding process in the target communication device. Further, the leading communication terminal may create and distribute the signals such that at least two communication terminals which configure the distributed communication terminal set transmit the same data stream using a data diversity transmitting method.

The leading communication terminal may create the signal so as to multiplex-transmit a plurality of independent signals using the at least two antennas which are equipped in the communication terminals which configure the distributed communication terminal set. The leading communication terminal may create a signal such that the distributed communication terminal set configured by the leading communication terminal including one antenna and the cooperative communication terminal including one antenna simultaneously transmits different signals through at least two antennas to transmit a signal by a multiplexing method. In this case, the signal which is transmitted by the leading communication terminal to the cooperative communication terminals is a transmission signal, transmission data, a transmission parameter, and a transmitting method and the transmission parameter includes a modulation parameter and a coding parameter.

FIG. 19 is a view illustrating a signal multiplexing method.

As illustrated in FIG. 19, a distributed communication terminal set configured by a leading communication terminal including one antenna and two cooperative communication terminals each including one antenna transmits a signal by the signal multiplex-transmitting method. A signal $x_1$, a signal $x_2$, and a signal $x_3$ may be simultaneously transmitted through the antenna of the leading communication terminal, the antenna of the first cooperative communication terminal, and an antenna of a second cooperative communication terminal, respectively. The target communication device decodes the signal by a multiplexing-receiving scheme such as zero-forcing (ZF), minimum mean square error (MMSE), or vertical-bell laboratories layered space-time (V-BLAST) so that a multiplexing gain may be obtained.

The multiplexer MIMO transmitting method is a multiplexing method which spatially divides and transmits signals for every target communication device and is a MIMO precoding transmitting method or a multiplexing transmitting method which transmits the target communication device signals by spatially dividing a plurality of independent target communication device signals so that the target communication device distinguishes its own signals.

Here, the leading communication terminal may create and distribute a signal such that the communication terminals which configure the distributed communication terminal set transmit a signal through the multiplexer MIMO transmitting method.

A beamforming method is a multiplexing method which divides a plurality of independent signals through directional beams having less interference to multiplex-transmit the signals and is a multiplex-transmitting method which forms a directional beam which is directed to the target communication device using channel information or position information of the plurality of target communication devices to transmit the target communication device signals using the directional beam.

Here, the leading communication terminal may create a signal such that the communication terminals which configure the distributed communication terminal set transmit a signal through the beamforming transmitting method.

The leading communication terminal may create and distribute the signals such that at least two communication terminals which configure the distributed communication terminal set transmit different data streams in accordance with a data multiplex-transmitting method.

The leading communication terminal may create a signal so as to transmit the signal by a method in which the signal diversity-transmitting method and the signal multiplex-transmitting are simultaneously performed using at least two antennas which are equipped in the communication terminals which configure the distributed communication terminal set.

FIG. 20 is a first view illustrating a hybrid transmitting method.

As illustrated in FIG. 20, a distributed communication terminal set configured by a leading communication terminal including one antenna and three cooperative communication terminals each including one antenna transmits a signal by a hybrid transmitting method. The leading communication terminal may create a signal so that a signal is transmitted through two communication terminals which configure the distributed communication terminal set by an Alamouti method and a signal is transmitted through another two communication terminals which configure the distributed communication terminal set by another Alamouti method. That is, at a first time slot, a signal $x_1$, a signal $x_2$, a signal $x_3$, and a signal $x_4$ may be transmitted through an antenna of the leading communication terminal, an antenna of a first cooperative communication terminal, an antenna of a second cooperative communication terminal, and an antenna of a third cooperative communication terminal, respectively. Next, at a second time slot, the signal $-x^*_2$ is transmitted through the antenna of the leading communication terminal, the signal $x^*_1$ is transmitted through the antenna of the first cooperative communication terminal, the signal $-x^*_4$ is transmitted through the antenna of the second cooperative communication terminal, and the signal $x^*_3$ is transmitted through the antenna of the third cooperative communication terminal.

FIG. 21 is a second view illustrating a hybrid transmitting method.

As illustrated in FIG. 21, a signal obtained by combining the signals $x_1$ and $x_4$ and a signal obtained by combining $x_2$ and $x_3$ are transmitted through two antennas which configure the distributed communication terminal set so that a signal may be created so as to perform hybrid transmission in which diversity transmission and multiplex-transmission are simultaneously performed. Here, $r=(-1+\sqrt{5})/2$.

In addition, the multiplex-transmitting method may include Double Alamouti, Stacked Alamouti, Double ABBA, Diagonal ABBA, Quasi-Orthogonal STBC (QOSTBC), a Threaded Algebraic Space-Time (TAST) code, a Golden code, a Heath code, a Generalized optimal diversity (GOD) code.

The leading communication terminal may use a diversity combining method, a multiplex-combining method, a cooperative combining method, and a hybrid combining method as a method for combining a plurality of collected signals.

1) Diversity combining method: When the leading communication terminal receives a signal which is transmitted by the signal diversity transmitting method from at least one target communication device, the leading communication terminal may combine signals collected from the at least one cooperative communication terminal and a signal collected by itself by a diversity combining method to obtain information.

Further, when the leading communication terminal receives a signal which is transmitted by a data diversity transmitting method from at least one target communication device, the leading communication terminal collects the same data streams from the at least one cooperative communication terminal and performs data diversity combination on the data streams having the same sequence number through the diversity combination to obtain a diversity gain so as to obtain information.

2) Multiplex-combining method: When the leading communication terminal receives a signal which is transmitted by a data multiplex-transmitting method from at least one target communication device, the leading communication terminal may obtain information through multiplex combination which may obtain a multiplex gain by collecting different data streams from the at least one cooperative communication terminal and aligning and combining the data streams which are directly received by itself and data streams which are collected from the at least one communication terminal using a stream sequence number.

3) Cooperative combining method: When the leading communication terminal receives a signal which is transmitted by a signal multiplex-transmitting method from at least one target communication device, the leading communication terminal collects the received signals using at least two antennas which configure the distributed communication terminal set to receive a signal by the cooperative combining method. In this case, the leading communication terminal may joint-decode the collected signals by a cooperative combining method such as maximum likelihood (ML), zero-forcing (ZF), an minimum mean square error (MMSE), a Vertical-Bell Laboratories Layered Space-Time (V-BLAST) to obtain information.

4) Hybrid-combining method: When the leading communication terminal receives a signal which is transmitted by a hybrid transmitting method in which the signal diversity transmitting method and the signal multiplex-transmitting method are mixed from at least one target communication device, the leading communication terminal may combine signals collected from the at least one cooperative communication terminal and a signal collected by itself by a hybrid combining method in which the signal diversity transmitting method and the cooperative combining method are simultaneously performed to obtain information.

Further, the leading communication terminal according to an exemplary embodiment of the present invention may index communication terminals including the leading communication terminal which configure the distributed communication terminal set. In other words, an order of communication terminals which configure the distributed communication terminal set is determined and a number is assigned thereto. In this case, it is not necessary that the leading communication terminal is the first communication terminal.

Further, the leading communication terminal indexes the communication terminals by determining the antennas which are equipped in the communication terminals including the leading communication terminal which configures the distributed communication terminal set and applying the number thereto.

FIG. 22 is a view illustrating a communication terminal indexing method for a distributed communication terminal set.

As illustrated in FIG. 22, when a distributed communication terminal set is configured by a leading communication terminal and two cooperative communication terminals, the leading communication terminal may set its own index as zero, an index of the first cooperative communication terminal as 1, and an index of the second cooperative communication terminal as 2.

FIG. 23 is a view illustrating an antenna indexing method for a distributed communication terminal set.

As illustrated in FIG. 23, when the distributed communication terminal set is configured by the leading communication terminal and two cooperative communication terminals and the leading communication terminal and two cooperative communication terminals include two antennas, respectively, the leading communication terminal may set an index of its own first antenna as 0-1, an index of a second antenna as 0-2, an index of a first antenna of the first cooperative communication terminal as 1-1, an index of a second antenna of the first cooperative communication terminal as 1-2, an index of a first antenna of the second cooperative communication terminal as 2-1, an index of a second antenna of the second cooperative communication terminal as 2-2, respectively.

Further, the at least one cooperative communication terminal according to the exemplary embodiment of the present invention receives a part of signals to be received from the at least one target communication device by the leading communication terminal and provides a signal which is obtained by processing a part of the received signals by a predetermined method to the leading communication terminal. In this case, the signal which is obtained by processing the part of received signals in accordance with the predetermined method by the at least one cooperative communication terminal may include channel state information, reception data, a decoded signal, and a demodulated signal.

The channel state information indicates a channel state between the at least one cooperative communication terminal and the at least one target communication device. When the at least one cooperative communication terminal includes at least two antennas or the at least one target communication device includes at least two antennas, the channel state information may indicate a channel state between the antennas of the at least one cooperative communication terminal and the antennas of the at least one target communication device.

The reception data indicates data which is restored from a part of reception signals received from the at least one target communication device by the at least one cooperative communication terminal.

The demodulated signal is a signal which is demodulated in the at least one cooperative communication terminal to be provided to the leading communication terminal.

The decoded signal is a signal which is decoded in the at least one cooperative communication terminal to be provided to the leading communication terminal.

The leading communication terminal according to an exemplary embodiment of the present invention needs to obtain channel state information between at least one cooperative communication terminal which configures a distributed communication terminal set in order to perform distributed communication with the at least one target communication device and the at least one target communication device. Next, a method for obtaining the channel state information by the leading communication terminal will be described.

At least one cooperative communication terminal measures the channel state information between the at least one cooperative communication terminal and the at least one target communication device using a part of reception signals received from the at least one target communication device and provides the measured channel state information to the leading communication terminal. Accordingly, the leading communication terminal collects the measured channel state information from the at least one target communication device to obtain the channel state information to perform the distributed communication with the at least one target communication device.

Further, the leading communication terminal collects the channel state information which is measured by the at least one cooperative communication terminal from the at least one target communication device to directly measure the channel state information in order to perform the distributed communication with the at least one target communication device and thus obtain the channel state information in order to perform the distributed communication with the at least one target communication device.

FIG. 24 is a view illustrating a method for obtaining channel state information.

As illustrated in FIG. 24, channels between a distributed communication terminal set which is configured by a leading communication terminal and two cooperative communication terminals each including two antennas and a target communication device including four antennas are illustrated. The channels between the distributed communication terminal set and the target communication device may be represented by a matrix H.

When the target communication device including four antennas transmits signals s1, s2, s3, and s4 through the antennas, a first antenna of the leading communication terminal including two antennas receives a signal $y_1^0$, a second antenna thereof receives a signal $y_2^0$, a first antenna of a first cooperative communication terminal receives a signal $y_1^1$, a second antenna thereof receives a signal $y_2^1$, a first antenna of a second cooperative communication terminal receives a signal $y_1^2$, and a second antenna thereof receives a signal $y_2^2$. When the signals which are received by the first cooperative communication terminal and the second cooperative communication terminal are provided to the leading communication terminal, the leading communication terminal may obtain a signal vector y which is obtained by vectorizing the signals $y_1^0$ and $y_2^0$ which are directly received from the target communication device and the signals $y_1^1$, $y_2^1$, $y_1^2$, and $y_2^2$ which are collected from two cooperative communication terminals each including two antennas and the signal vector y may be represented by the following Equation 1. In this case, the leading communication terminal may directly measure the channel matrix H for performing the distributed communication with the target communication device using the signal vector y.

$$y = \begin{bmatrix} y_1^0 \\ y_2^0 \\ y_1^1 \\ y_2^1 \\ y_1^2 \\ y_2^2 \end{bmatrix} = \begin{bmatrix} h_{11}^0 & h_{12}^0 & h_{13}^0 & h_{14}^0 \\ h_{21}^0 & h_{22}^0 & h_{23}^0 & h_{24}^0 \\ h_{11}^1 & h_{12}^1 & h_{13}^1 & h_{14}^1 \\ h_{21}^1 & h_{22}^1 & h_{23}^1 & h_{24}^1 \\ h_{11}^2 & h_{12}^2 & h_{13}^2 & h_{14}^2 \\ h_{21}^2 & h_{22}^2 & h_{23}^2 & h_{24}^2 \end{bmatrix} \begin{bmatrix} s_1 \\ s_2 \\ s_3 \\ s_4 \end{bmatrix} = Hs \quad \text{[Equation 1]}$$

Here, $y_j^i$ is a signal which is obtained by an i-th cooperative communication terminal through a j-th antenna, $h_{mn}^l$ is a channel gain between an m-th antenna of a l-th cooperative communication terminal and an n-th antenna of the target communication device and $s_k$ is a signal which is transmitted through a k-th antenna of the target communication device. Further, a 0-th cooperative communication terminal refers to the leading communication terminal.

As another example, when the target communication device including four antennas transmits signals s1, s2, s3, and s4 through the antennas, a first antenna of the leading communication terminal including two antennas receives a signal $y_1^0$, a second antenna thereof receives a signal $y_2^0$, a first antenna of a first cooperative communication terminal receives a signal $y_1^1$, a second antenna thereof receives a signal $y_2^1$, a first antenna of a second cooperative communication terminal receives a signal $y_1^2$, and a second antenna thereof receives a signal $y_2^2$. In this case, the first cooperative communication terminal measures $h_{11}^1$, $h_{12}^1$, $h_{13}^1$, $h_{14}^1$, $h_{21}^1$, $h_{22}^1$, $h_{23}^1$, $h_{24}^1$ using the signals $y_1^1$, and $y_2^1$ which are received by itself to be provided to the leading communication terminal. The leading communication terminal collects the signals $y_1^0$, and $y_2^0$ received by itself and the signals $y_1^2$, and $y_2^2$ which are received by the second cooperative communication terminal to directly measure $h_{11}^0$, $h_{12}^0$, $h_{13}^0$, $h_{14}^0$, $h_{21}^0$, $h_{22}^0$, $h_{23}^0$, $h_{24}^0$ and $h_{11}^2$, $h_{12}^2$, $h_{13}^2$, $h_{14}^2$, $h_{21}^2$, $h_{22}^2$, $h_{23}^2$, $h_{24}^2$ and collects $h_{11}^1$, $h_{12}^1$, $h_{13}^1$, $h_{14}^1$, $h_{21}^1$, $h_{22}^1$, $h_{23}^1$, $h_{24}^1$ which are measured and provided by the first cooperative communication terminal to obtain the channel matrix H in order to perform the distributed communication with the target communication device.

FIG. 25 is a diagram illustrating a detailed configuration of a communication terminal according to an exemplary embodiment of the present invention.

As illustrated in FIG. 25, a communication terminal according to an exemplary embodiment of the present invention is a concept including a leading communication terminal or a cooperative communication terminal and may include a transceiving unit 210, a collecting unit 220, a combining unit 230, an establishing unit 240, an indexing unit 250, an obtaining unit 260, and a creating unit 270.

The transceiving unit 210 may receive at least one first signal from at least one target communication device.

The collecting unit 220 may collect at least one second signal, which is received from at least target communication device, from the at least one cooperative communication terminal or at least one third signal which is obtained by processing the at least one second signal through a preset processing scheme from the at least one cooperative communication terminal.

The combining unit 230 may combine the at least one first signal which is received and at least one second signal which is collected or the at least one first signal and the at least one third signal.

The establishing unit 240 may establish a backhaul link with each of at least one cooperative communication terminal which performs distributed communication with the at least one target communication device.

The indexing unit 250 may index the communication terminal and the at least one cooperative communication terminal or index at least one antenna which is equipped in the communication terminal and at least one antenna which is equipped in the at least one cooperative communication terminal.

The obtaining unit 260 directly measures and obtains channel state information between the communication terminal and the at least one cooperative communication terminal and the at least one target communication device using signals which are directly received and a part of reception signals which are collected from the at least one cooperative communication terminal or obtains the channel state information by directly measuring a part of channel state information between the communication terminal and the at least one cooperative communication terminal and the at least one target communication device using signals which are directly received and a part of reception signals which are collected from a part of the at least one cooperative communication terminal among the at least one cooperative communication terminal and by being offered another part of the channel stage information from another part of the at least one cooperative communication terminal.

The creating unit 270 may create at least one signal which is directly transmitted to the at least one target communication device, at least one second signal which is distributed-transmitted through the at least one cooperative communication terminal or at least one third signal which is required to create the at least one second signal.

The transceiving unit 210 may transmit at least one created first signal to the at least one target communication device and provide the at least one second signal or at least one third signal which are created to a predetermined at least one cooperative communication terminal.

The above-described exemplary embodiments of the present invention may be created by a computer executable program and implemented in a general use digital computer which operates the program using a computer readable medium. The computer readable recording medium includes a magnetic storage medium (for example, a ROM, a floppy disk, and hard disk), a storing medium such as an optical reading medium (for example, CD-ROM, a DVD).

The exemplary embodiments of the present invention which have been described above are examples and it is obvious to those skilled in the art that various changes or modifications may be made without departing from the spirit and scope of the present invention. Accordingly, the exemplary embodiments disclosed herein are not intended to limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. A communication method which performs distributed communication in a communication system, comprising:
   determining whether to perform distributed reception or distributed transmission;
   in response to determining to perform distribution reception, performing distributed reception, wherein the performing distributed reception comprises:
      receiving, by a first communication terminal, at least one first signal from at least one target communication device;
      receiving, by at least one second communication terminal, at least one second signal from the at least one target communication device;
      creating, by the at least one second communication terminal, at least one third signal by processing the at least one second signal through a first processing scheme;
      collecting, by the first communication terminal, the at least one third signal from the at least one second communication terminal; and
      combining, by the first communication terminal, the at least one first signal and the at least one third signal,
      wherein the first communication terminal:
         determines the at least one second communication terminal for the performing distributed reception;
         determines, for the performing distributed reception, at least one antenna from among a plurality of antennas of the first communication terminal and at least one antenna from among a plurality of antennas of the determined at least one second communication terminal;
         indexes the first communication terminal and the determined at least one second communication terminal for the performing distributed reception; and
         indexes the determined at least one antenna of the first communication terminal and the determined at least one antenna of the determined at least one second communication terminal for the performing distributed reception; and
   in response to determining to perform distribution transmission, performing distributed transmission, wherein, the performing distributed transmission comprises:
      creating, by the first communication terminal, at least one fourth signal;
      creating, by the first communication terminal, at least one sixth signal;
      providing, by the first communication terminal, the at least one sixth signal to at least one third communication terminal;
      creating, by the at least one third communication terminal, at least one fifth signal by processing the at least one sixth signal through a second processing scheme;
      transmitting, by the first communication terminal, the at least one fourth signal to the at least one target communication device; and
      transmitting, by the at least one third communication terminal, the at least one fifth signal to the at least one target communication device,
      wherein the first communication terminal:
         determines the at least one third communication terminal for the performing distributed transmissions;
         determines, for the performing distributed transmission, at least one antenna from among the plurality of antennas of the first communication terminal and at least one antenna from among a plurality of antennas of the determined at least one third communication terminal;
         indexes the first communication terminal and the determined at least one third communication terminal for the performing distributed transmission; and
         indexes the determined at least one antenna of the first communication terminal and the determined at least one antenna of the determined at least one third communication terminal for the performing distributed transmission.

2. The communication method for claim 1, further comprising:
   when performing the distributed reception, establishing, by the first communication terminal, a first backhaul link with each of the at least one second communication terminal, and
   when performing the distributed transmission, establishing a second backhaul link with each of the at least one third communication terminal.

3. The communication method for claim 1, wherein the first processing scheme includes at least one of a receiving scheme, a demodulating scheme, a decoding scheme, and a hybrid automatic repeat requests (HARQ) scheme, and
   wherein the second processing scheme includes at least one of a transmitting method, assigning a transmission resource, a modulating method, an encoding method, adjusting a transmission time, assigning a carrier frequency, adjusting a transmission sequence, and an information processing method.

4. The communication method for claim 1, wherein in the collecting of the at least one third signal, the first communication terminal collects a first part of the at least one third signal which is obtained by processing a first part of the at least one second signal received by a first part of the at least one second communication terminal, through a first set of the first processing scheme, and
   the first communication terminal collects a second part of the at least one third signal which is obtained by processing a second part of the at least one second signal received by a second part of the at least one second communication terminal, through a second set of the first processing scheme.

5. The communication method for claim 1, wherein in the combining of at least one first signal and the at least one third signal, the first communication terminal restores the at least one second signal based on the at least one third signal; and the first communication terminal combines the at least one first signal and the restored at least one second signal using any one of a diversity combining method, a multiplex-combining method, a cooperative combining method, and a hybrid combining method.

6. The communication method for claim 1, wherein the combining of at least one first signal and the at least one third signal comprises:

obtaining, by the first communication terminal, at least one seventh signal which is obtained by processing the at least one first signal through the same scheme as the first processing scheme used by the at least one second communication terminal through which the at least one third signal is obtained, and combining the at least one seventh signal with the at least one third signal.

7. The communication method for claim 1, wherein in the creating of the at least one sixth signal, the first communication terminal creates a first part of the at least one sixth signal which is required to create a first part of the at least one fifth signal by performing a first set of the second processing scheme by a first part of the at least one third communication terminal; and the first communication terminal creates a second part of at least one sixth signal which is required to create a second part of the at least one fifth signal by performing a second set of the second processing scheme by a second part of the at least one third communication terminal.

8. A communication system in which a communication terminal communicates with at least one target communication device under cooperation of at least one cooperative communication terminal, the communication terminal comprising a processor and a non-transitory computer readable medium, wherein, the processor determines whether to perform distributed reception or distributed transmission, wherein, in response to determining to perform distributed reception, the processor executes computer program instructions embodied in the non-transitory computer readable medium to perform the steps of:

receiving at least one first signal from the at least one target communication device;

collecting at least one third signal which is obtained by processing at least one second signal through a first processing scheme by the at least one cooperative communication terminal; and combining the received at least one first signal and the collected at least one third signal, wherein the processor determines the at least one cooperative communication terminal for the performing distributed reception and determines, for the performing distributed reception, at least one antenna from among a plurality of antennas of the communication terminal and at least one antenna from among a plurality of antennas of the determined at least one cooperative communication terminal, and wherein the communication terminal indexes the communication terminal and the determined at least one cooperative communication terminal for the performing distributed reception, and indexes the determined at least one antenna of the communication terminal and the determined at least one antenna of the determined at least one cooperative communication terminal for the performing distributed reception, and wherein, in response to determining to perform distributed transmission, the processor executes computer program instructions embodied in the non-transitory computer readable medium to perform the steps of:

creating at least one fourth signal to be directly transmitted to the at least one target communication device;

creating at least one sixth signal which is required to create at least one fifth signal by performing a second processing scheme;

transmitting the created at least one fourth signal to the at least one target communication device; and providing the at least one sixth signal to the at least one cooperative communication terminal, wherein, by at least one cooperative communication terminal, the at least one sixth signal is received from the communication terminal, the at least one fifth signal is created by processing the at least one sixth signal through the second processing scheme, and the at least one fifth signal is transmitted to the at least one target communication device, wherein the processor determines the at least one cooperative communication terminal for the performing distributed transmission, and determines at least one antenna from among the plurality of antennas of the communication terminal and at least one antenna from among the plurality of antennas of the determined at least one cooperative communication terminal for the performing distributed transmission, and wherein the communication terminal indexes the communication terminal and the determined at least one cooperative communication terminal for the performing distributed transmission, and indexes the determined at least one antenna of the communication terminal and the determined at least one antenna of the determined at least one cooperative communication terminal for the performing distributed transmission.

9. The communication system of claim 8, wherein, when performing the distributed reception or the distributed transmission, the processor further performs:

establishing a backhaul link with the at least one cooperative communication terminal which communicates with the at least one target communication device.

* * * * *